(12) United States Patent
Tokunaga et al.

(10) Patent No.: US 9,729,769 B2
(45) Date of Patent: Aug. 8, 2017

(54) CAMERA AND CAMERA ACCESSORY

(71) Applicant: CANON KABUSHIKI KAISHA, Tokyo (JP)

(72) Inventors: Tatsuyuki Tokunaga, Saitama (JP); Takashi Hasegawa, Tokyo (JP); Tetsuya Nishio, Kawasaki (JP); Yoshihiko Konno, Tachikawa (JP); Hiroshi Kikuchi, Zushi (JP); Azusa Sugawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 14/389,865

(22) PCT Filed: Apr. 3, 2013

(86) PCT No.: PCT/JP2013/060768
§ 371 (c)(1),
(2) Date: Oct. 1, 2014

(87) PCT Pub. No.: WO2013/151183
PCT Pub. Date: Oct. 10, 2013

(65) Prior Publication Data
US 2015/0049244 A1   Feb. 19, 2015

(30) Foreign Application Priority Data

Apr. 4, 2012  (JP) .................................. 2012-085190
Apr. 4, 2012  (JP) .................................. 2012-085223
(Continued)

(51) Int. Cl.
*H04N 5/68*   (2006.01)
*G02B 13/16*   (2006.01)
(Continued)

(52) U.S. Cl.
CPC ........... *H04N 5/2254* (2013.01); *G03B 17/14* (2013.01); *G03B 17/565* (2013.01); *H04N 5/23209* (2013.01); *G03B 2206/00* (2013.01)

(58) Field of Classification Search
CPC ............. H04N 5/23209; H04N 5/2254; H04N 5/2252; H04N 5/23203; H04N 5/2253; G02B 7/14
(Continued)

(56) References Cited

U.S. PATENT DOCUMENTS 4,448,509 A   5/1984   Katsuma et al.
4,737,812 A   4/1988   Hasegawa et al.
(Continued)

FOREIGN PATENT DOCUMENTS

CN   1761910 A   4/2006
CN   1806204 A   7/2006
(Continued)

*Primary Examiner* — Lin Ye
*Assistant Examiner* — Euel Cowan
(74) *Attorney, Agent, or Firm* — Canon U.S.A. Inc., IP Division

(57) ABSTRACT

The present invention provides the following camera. A first camera-side contact pin is a pin corresponding to detection of a signal change caused by coupling of a camera accessory. A second camera-side contact pin is a pin corresponding to supply of power for communication with the coupled camera accessory. A third camera-side contact pin is a pin corresponding to supply of a driving force to an actuator of the camera accessory. The first, second, and third camera-side contact pins are disposed in such a manner that, when a camera-side mount shifts from a first state to a second state, the third camera-side contact pin contacts first and second accessory-side contact surfaces, the second camera-side contact pin contacts the first accessory-side contact
(Continued)

surface, and the first camera-side contact pin does not contact the second and third accessory-side contact surfaces.

12 Claims, 21 Drawing Sheets

(30) Foreign Application Priority Data

| | | |
|---|---|---|
| Apr. 4, 2012 | (JP) | 2012-085426 |
| Jul. 5, 2012 | (JP) | 2012-150961 |
| Jul. 20, 2012 | (JP) | 2012-161644 |

(51) Int. Cl.

| | |
|---|---|
| *G03B 17/00* | (2006.01) |
| *H04N 5/225* | (2006.01) |
| *G03B 17/14* | (2006.01) |
| *H04N 5/232* | (2006.01) |
| *G03B 17/56* | (2006.01) |

(58) Field of Classification Search
USPC .............. 348/335, 374–376; 396/529–532
See application file for complete search history.

(56) References Cited

U.S. PATENT DOCUMENTS

| | | | |
|---|---|---|---|
| 4,739,356 A | 4/1988 | Ogura et al. | |
| 4,841,322 A | 6/1989 | Kawasaki et al. | |
| 4,853,725 A | 8/1989 | Matsuda et al. | |
| 4,999,659 A | 3/1991 | Fukahori et al. | |
| 5,030,982 A | 7/1991 | Takebayashi | |
| 5,177,520 A * | 1/1993 | Kohno | G03B 17/14 |
| | | | 396/129 |
| 5,781,818 A | 7/1998 | Kobayashi | |
| 6,041,189 A | 3/2000 | Izukawa | |
| 6,352,378 B1 | 3/2002 | Izukawa | |
| 2001/0017740 A1 | 8/2001 | Nomura | |
| 2004/0028400 A1 | 2/2004 | Murakami | |
| 2004/0046890 A1 | 3/2004 | Kikuchi et al. | |
| 2004/0202464 A1 | 10/2004 | Miyasaka | |
| 2005/0268000 A1 | 12/2005 | Carlson | |
| 2007/0077063 A1 * | 4/2007 | Tokiwa | G03B 17/14 |
| | | | 396/532 |
| 2008/0304818 A1 | 12/2008 | Kranz | |
| 2012/0063016 A1 | 3/2012 | Imafuji | |

FOREIGN PATENT DOCUMENTS

| | | |
|---|---|---|
| CN | 1984257 A | 6/2007 |
| CN | 202102220 U | 1/2012 |
| CN | 102385141 A | 3/2012 |
| CN | 203241681 U | 10/2013 |
| CN | 203241682 U | 10/2013 |
| CN | 203241683 U | 10/2013 |
| CN | 203275857 U | 11/2013 |
| EP | 0262679 A2 | 4/1988 |
| EP | 1672420 A1 | 6/2006 |
| JP | S59-48742 A | 3/1984 |
| JP | S62-32426 A | 2/1987 |
| JP | S62-195633 A | 8/1987 |
| JP | S62-220937 A | 9/1987 |
| JP | H02-222934 A | 9/1990 |
| JP | H07-043773 A | 2/1995 |
| JP | H07-114087 A | 5/1995 |
| JP | H09-90488 A | 4/1997 |
| JP | H09-211645 A | 8/1997 |
| JP | H11-223865 A | 8/1999 |
| JP | 2000-047308 A | 2/2000 |
| JP | 2000-47308 A | 2/2000 |
| JP | 2001-034327 A | 2/2001 |
| JP | 2002-341424 A | 11/2002 |
| JP | 2004-069990 A | 3/2004 |
| JP | 2004-117380 A | 4/2004 |
| JP | 2004-361898 A | 12/2004 |
| JP | 2005-043578 A | 2/2005 |
| JP | 2005-115170 A | 4/2005 |
| JP | 2005-157001 A | 6/2005 |
| JP | 2007-101656 A | 4/2007 |
| JP | 2009-093122 A | 4/2009 |
| JP | 2009-288782 A | 12/2009 |
| JP | 2010-282101 A | 12/2010 |
| JP | 5645889 B2 | 12/2014 |
| WO | 2009/048074 A1 | 4/2009 |

* cited by examiner

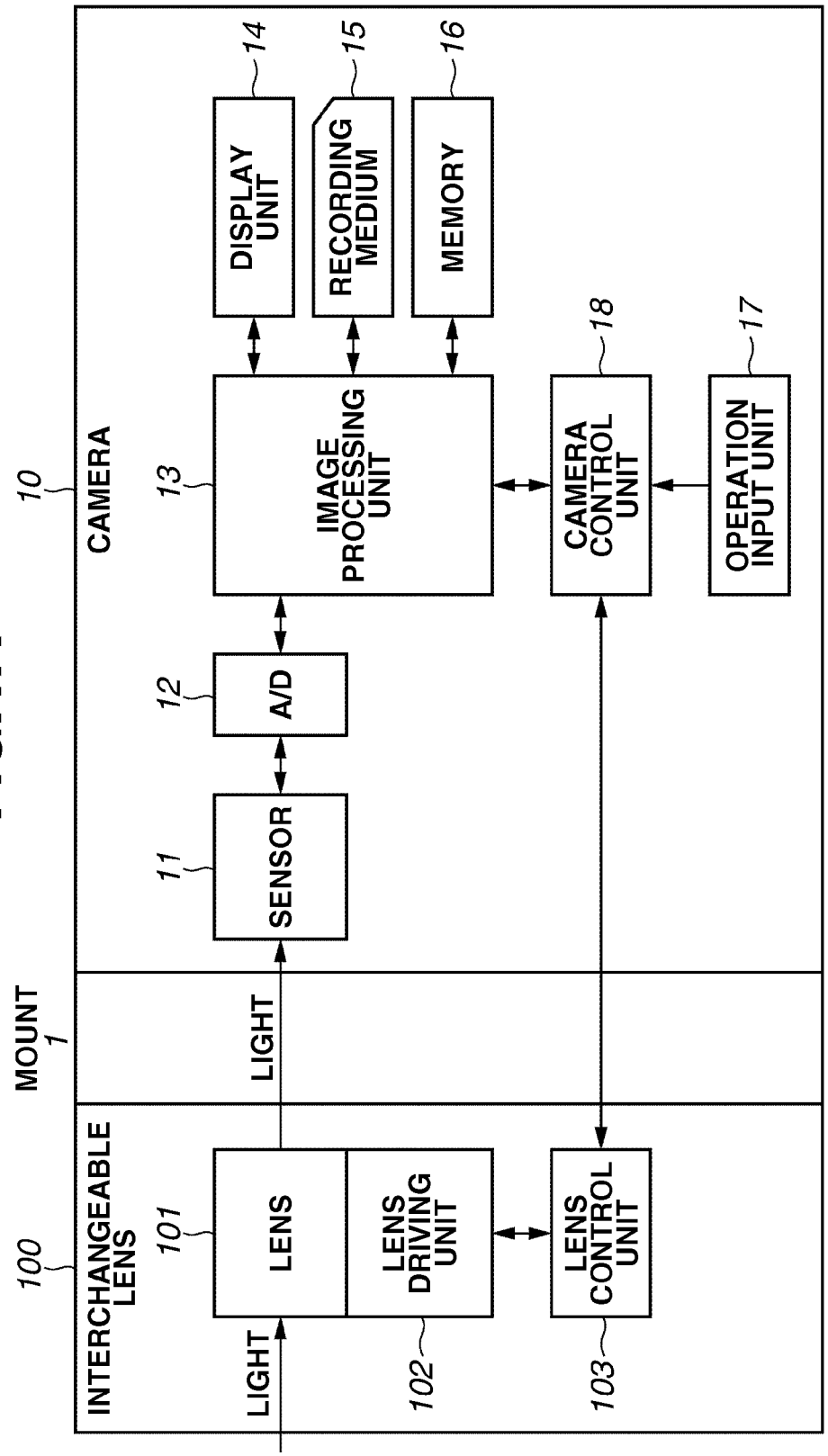

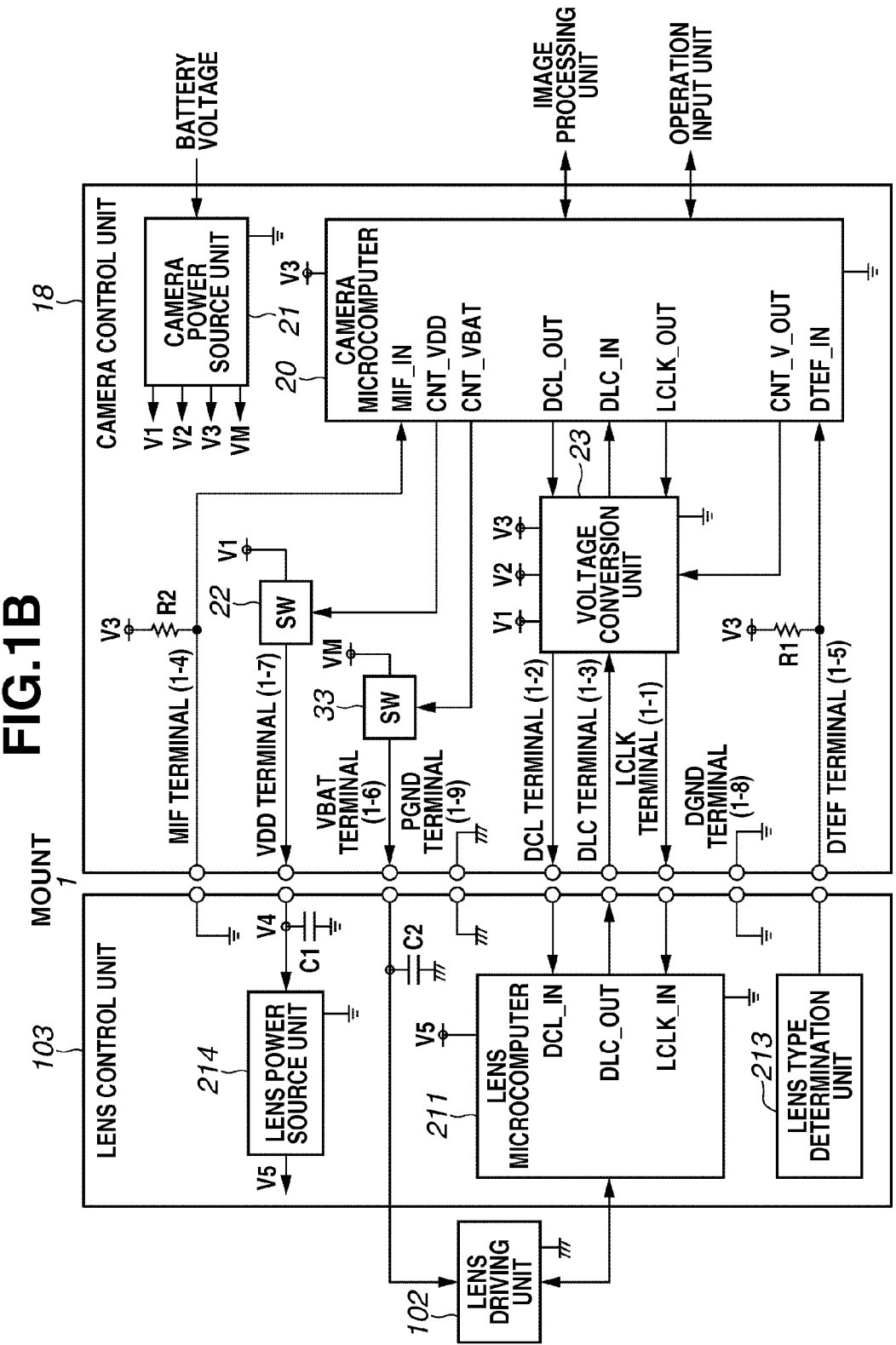

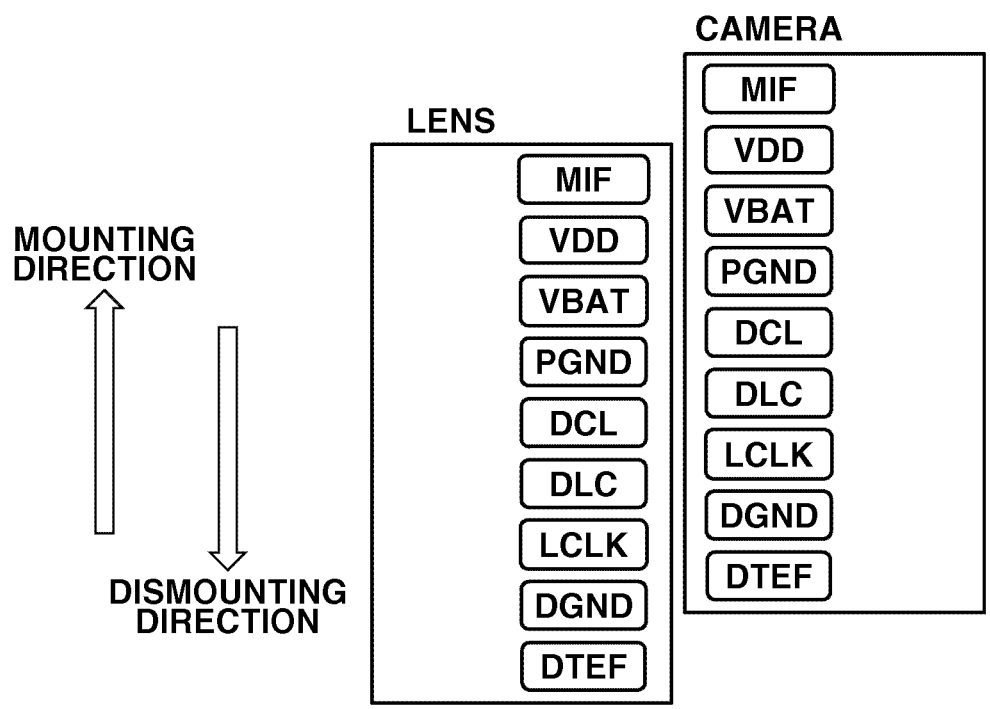

(MIF)(VDD)(VBAT)(PGND)(DCL)(DLC)(LCLK)(DGND)(DTEF)

(DTEF)(DGND)(LCLK)(DLC)(DCL)(PGND)(VBAT)(VDD)(MIF)

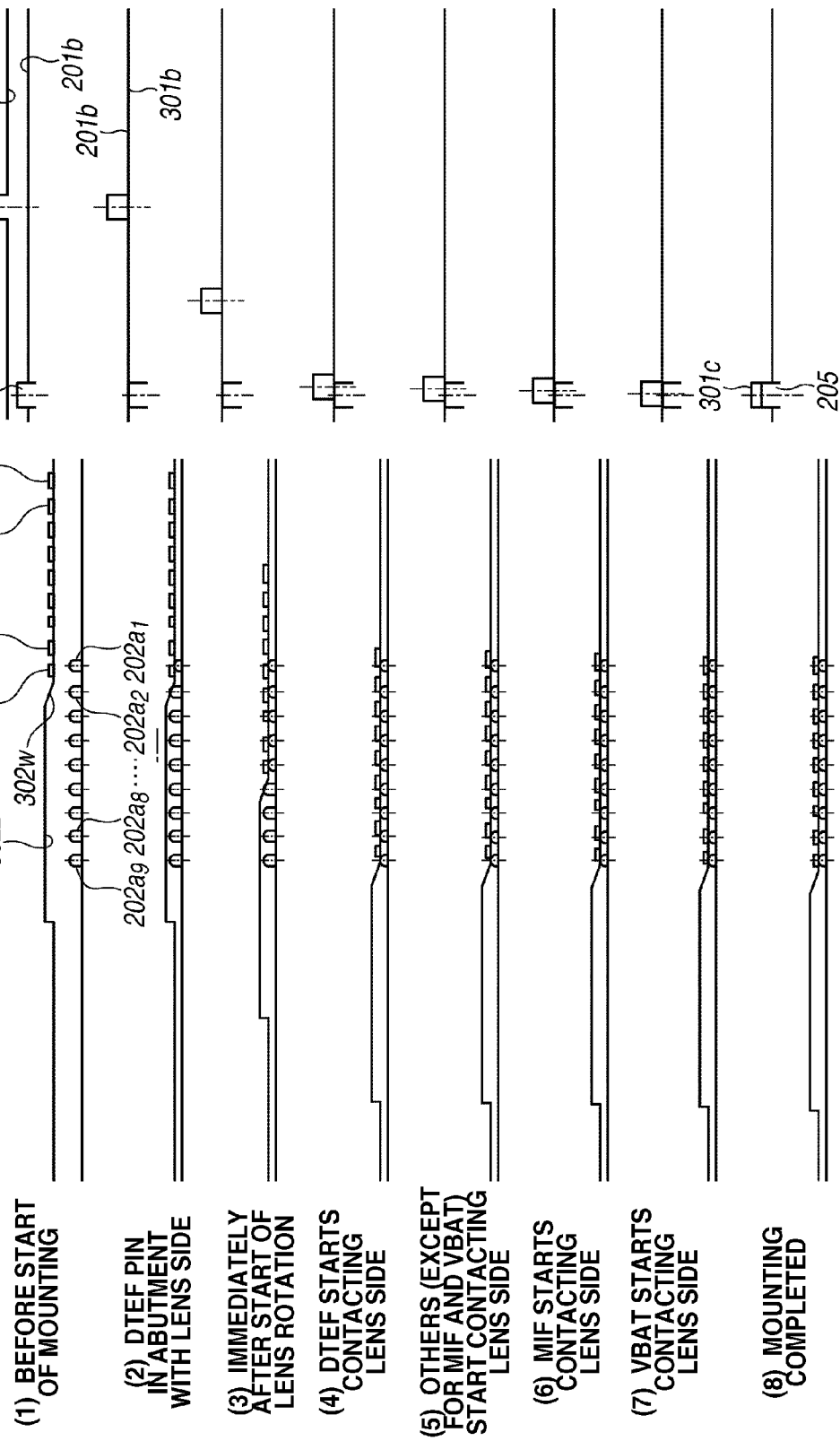

CAMERA AND CAMERA ACCESSORY

TECHNICAL FIELD

The present invention relates to a camera, and a camera accessory such as an interchangeable lens interchangeably mounted on the camera.

BACKGROUND ART

A camera accessory (hereinafter referred to just as an accessory) receives power supply from a camera and exchanges a command, data, and the like with the camera in a state mounted on the camera. A plurality of contacts, which is electrically connected by making a contact with each other, is formed at mounting portions (mounts) of the camera and the accessory to allow the power supply and communication. Further, in many cases, a bayonet coupling method is employed for attachment (coupling) between the camera and the accessory. According to the bayonet coupling method, a relative rotation is performed between the mounts of the camera and the accessory to engage bayonet teeth provided on the respective mounts with each other.

Japanese Patent Application Laid-Open No. 62-195633 discusses a camera and an interchangeable lens respectively including mounts configured to be attached to each other by the bayonet coupling method. When the camera and the interchangeable lens are in a coupling completion state after a relative rotation between the mounts of the camera and the interchangeable lens, a plurality of camera-side contact pins provided on the camera-side mount and a plurality of lens-side contact pins (contact surfaces) provided on the lens-side mount are in contact with each other. The camera-side contact pins and the lens-side contact pins are held by contact seats provided on the mounts. A hole for holding the camera-side contact pin is formed at the camera-side contact seat. A spring, which biases the camera-side contact pin in a direction causing the camera-side contact pin to project from the hole, is disposed between the camera-side contact pin inserted in the hole and a bottom surface (a printed wiring board) of the hole. On the other hand, the lens-side contact pin is fixed to the lens-side contact seat.

In recent years, the mount has been formed by molding for the purpose of reducing a weight of the camera. Hereinafter, the mount mold-formed in this manner will be referred to as a molded mount. Further, in some cases, a plate spring may be used as the contact spring, which biases the camera-side electric contact pin in the projecting direction, for the purpose of reducing a thickness of the camera.

Further, the camera-side and lens-side contact pins include a power supply contact pin for supplying power from the camera to the accessory to drive an actuator in the accessory, and a control contact pin for exchanging a signal to control the accessory.

There are following problems in the camera and the accessory having the mounts (especially, the molded mounts) provided with the contact pins as described above.

FIG. 19 illustrates a camera 401 with an interchangeable lens 402 as an accessory mounted thereon when the camera 401 is dropped onto a ground surface 405. When the camera 401 is dropped, it is highly likely that a tip of the interchangeable lens 402 which is heavier hits against the ground surface 405 first. In this case, a maximum external force for pulling off mounts is generated at lowermost portions of the mounts that couple the camera 401 with the interchangeable lens 402. Therefore, it is desirable to dispose an engagement portion of bayonet teeth, and attachment portions using fastening screws for respectively attaching the camera-side mount and the lens-side mount to a camera main body and an interchangeable lens main body at a phase including the lowermost portions of the camera-side and lens-side mounts.

However, in a case where the camera-side contact pin is provided at the same position as the fastening screw in a mount circumferential direction, and the plate spring is used as the contact spring for biasing the camera-side contact pin in the projecting direction, the plate spring should be disposed so as to avoid the fastening screw, which leads to the necessity of increasing a pitch between the contact pins. This results in an increase in an angular range occupied by the contact pins at the mount, hindering a reduction in the size of the camera.

On the other hand, the camera includes a motor as an actuator for driving, for example, a shutter, and noises generated by this motor may affect control of the lens-side accessory which causes a malfunction of the accessory.

Further, wiring is laid from a power source circuit to the power supply contact pin provided at the camera via a flexible board or the like. If the length of this wiring is long, a loss due to a wiring resistance may increase.

SUMMARY OF INVENTION

The present invention is directed to a camera and a camera accessory capable of reducing an angular range occupied by contacts at amount, so that a size of the camera can be reduced. Further, the present invention is directed to a camera and a camera accessory capable of reducing a loss due to a wiring resistance regarding power supply, and further, impervious to noises.

According to an aspect of the present invention, a camera includes a camera-side mount to which an accessory-side mount disposed in a camera accessory including an actuator is detachably coupled. The camera is communicable with the coupled camera accessory. The camera-side mount is configured to shift from a first state to a second state. The first state is such a state that an accessory-side bayonet tooth disposed in the accessory-side mount is inserted between a plurality of camera-side bayonet teeth, and the second state is such a state that a relative rotation between the camera-side mount and the accessory-side mount causes the camera-side bayonet teeth and the accessory-side bayonet tooth to be engaged with each other to complete coupling between the camera-side mount and the accessory-side mount. An accessory-side contact holding portion disposed in the accessory-side mount holds first, second, and third accessory-side contact surfaces disposed in a relative rotational direction of the accessory-side mount and the camera-side mount. In the second state, first, second, and third camera-side contact pins are in contact with the first, second, and third accessory-side contact surfaces, respectively, whereby an electric connection is established between the camera and the camera accessory. The first, second, and third camera-side contact pins are disposed in such a manner that, when the camera-side mount shifts from the first state to the second state, the third camera-side contact pin contacts the first and second accessory-side contact surfaces, the second camera-side contact pin contacts the first accessory-side contact surface, and the first camera-side contact pin does not contact the second and third accessory-side contact surfaces. The first camera-side contact pin is a pin corresponding to detection of a signal change caused by coupling of the camera accessory, the second camera-side contact pin is a pin corresponding to supply of power for communication with the coupled camera accessory, and the third camera-side contact pin is a pin corresponding to supply of a driving force to the actuator of the camera accessory.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 1A is a block diagram illustrating electric configurations of an interchangeable lens according to a first exemplary embodiment of the present invention and a camera on which the interchangeable lens is mounted.

FIG. 1B is a block diagram illustrating electric configurations of an interchangeable lens according to a first exemplary embodiment of the present invention and a camera on which the interchangeable lens is mounted.

FIG. 1C is a block diagram illustrating electric configurations of an interchangeable lens according to a first exemplary embodiment of the present invention and a camera on which the interchangeable lens is mounted.

FIGS. 5(1) to (8) illustrate how the above-described connectors contact each other during a coupling procedure of the mounts disposed in the interchangeable lens according to the first exemplary embodiment and the above-described camera.

DESCRIPTION OF EMBODIMENTS

Figure 2A:
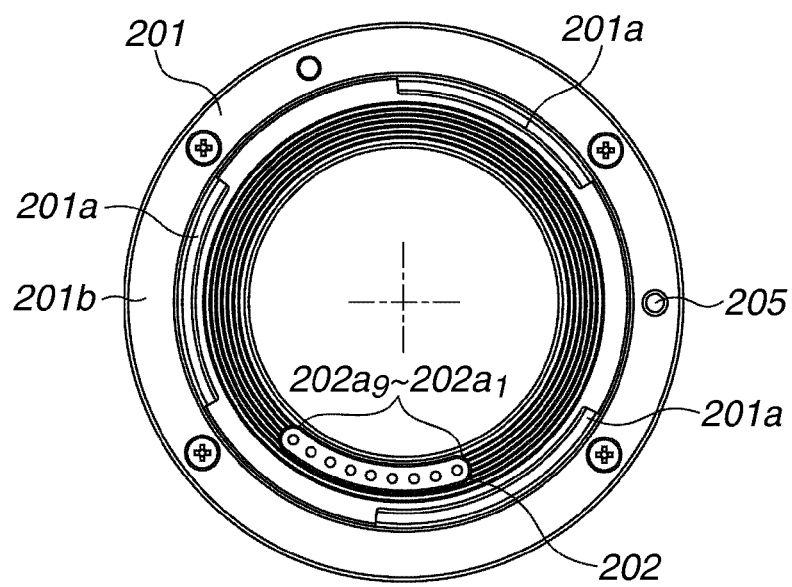
FIG. 2A illustrates a configuration of mounts and connectors disposed in the interchangeable lens according to the first exemplary embodiment and the above-described camera.

Various exemplary embodiments, features, and aspects of the invention will be described in detail below with reference to the drawings.

FIG. 1A illustrates a camera system including an interchangeable lens 100 as a camera accessory according to a first exemplary embodiment of the present invention, and a camera 10 with the interchangeable lens 100 detachably mounted thereon. The camera 10 and the interchangeable lens 100 each include a mount 1 having electric contacts for supplying power from the camera 10 to the interchangeable lens 100, and allowing communication between the camera 10 and the interchangeable lens 100. In the present exemplary embodiment, the interchangeable lens 100 will be described as a camera accessory mountable onto the camera 10, but camera accessories other than the interchangeable lens 100 are also included in the present invention as other exemplary embodiments.

The camera 10 includes an image sensor 11 configured to output an electric signal by photoelectrically converting an optical object image, which is formed by a shooting lens 101 in the interchangeable lens 100. Further, the camera 10 includes an analog/digital (AD) conversion unit 12 configured to convert the analog electric signal output from the image sensor 11 to a digital signal, and an image processing unit 13 configured to generate a video signal by performing various kinds of image processing on the digital signal. The video signal (a still image and a moving image) generated by the image processing unit 13 is displayed on a display unit 14 and/or is recorded in a recording medium 15.

Further, the camera 10 includes a memory 16 configured to function as a buffer when the video signal is processed, and store an operation program to be used by a camera control unit 18, which will be described below. Further, the camera 10 includes an operation input unit 17 including, for example, a power source switch for turning on and off a power source, a shooting switch for starting to record the video signal, and a selection/setting switch for setting various kinds of items in a menu. The camera control unit 18 includes a microcomputer. The camera control unit 18 controls the image processing unit 13 according to a signal from the operation input unit 17, and controls communication with the interchangeable lens 100.

On the other hand, the interchangeable lens 100 includes a lens driving unit 102 configured to drive an actuator for causing a focus lens, a zoom lens, a diaphragm, and an image stabilization lens, which are included in the shooting lens 101 and are not illustrated in FIG. 1A, to move or operate. Further, the interchangeable lens 100 includes a lens control unit 103 having a microcomputer that controls the lens driving unit 102 according to a control signal received from the camera control unit 18 via communication.

FIG. 1B illustrates terminals provided at the mount 1 to establish an electric contact between the camera 10 (the camera control unit 18) and the interchangeable lens 100 (the lens control unit 103).

An LCLK terminal (1-1) is a terminal for a communication clock signal output from the camera 10 to the interchangeable lens 100. A DCL terminal (1-2) is a terminal for communication data output from the camera 10 to the interchangeable lens 100. A DLC terminal (1-3) is a terminal for communication data output from the interchangeable lens 100 to the camera 10.

An MIF terminal (1-4) is a terminal for detecting that the interchangeable lens 100 is mounted on the camera 10. The microcomputer 20 in the camera control unit 18 (hereinafter referred to as a camera microcomputer) detects that the interchangeable lens 100 is mounted on the camera 10 based on a voltage of the MIF terminal.

A DTEF terminal (1-5) is a terminal for detecting the type of the interchangeable lens 100 mounted on the camera 10. The camera microcomputer 20 detects the type of the interchangeable lens 100 mounted on the camera 10 based on a voltage of the DTEF terminal.

A VBAT terminal (1-6) is a terminal for supplying driving power (VM) for use in various kinds of operations except for communication control from the camera 10 to the interchangeable lens 100. A VDD terminal (1-7) is a terminal for supplying communication control power (VDD) for use in communication control from the camera 10 to the interchangeable lens 100. A DGND terminal (1-8) is a terminal for connecting a communication control system of the camera 10 and the interchangeable lens 100 to a ground. A PGND terminal (1-9) is a terminal for connecting a mechanical driving system including, for example, motors disposed in the camera 10 and the interchangeable lens 100 to the ground.

Assume that there is a first interchangeable lens, and a second interchangeable lens that operates based on a different communication voltage from the first interchangeable lens, as the type of the interchangeable lens 100 that the camera 10 identifies based on the voltage of the DTEF terminal. Now, this case will be described. The communication voltage will be described below.

A camera power source unit 21 provided in the camera control unit 18 converts a battery voltage supplied from a not-illustrated battery installed on the camera 10 into a voltage required for an operation of each circuit. At this time, the power source unit 21 generates voltages V1, V2, V3, and VM.

The voltage V1 is a voltage as the communication control voltage (VDD) of the first and second interchangeable lenses, and a communication voltage of the first interchangeable lens. The voltage V2 is a communication voltage of the second interchangeable lens. The voltage v3 is a voltage as operation power of the camera microcomputer 20. The voltage VM is a voltage as driving power of the first and second interchangeable lenses as described above. The voltages V1 and V2 are voltages different from each other. However, the voltage V1, and the voltage V3 or VM may be a same voltage. Further, the voltage V2, and the voltage V3 or VM may be a same voltage.

For example, when the camera 10 shifts into an operating state with the interchangeable lens 100 mounted on the camera 10, the camera microcomputer 20 turns on a power source switch 22 by a CNT_VDD signal. Then, the camera 10 starts supplying the communication control voltage (VDD) to the interchangeable lens 100. When the camera 10 shifts into an OFF state, the microcomputer 20 turns off the power source switch 22, and the camera 10 stops supplying the communication control power (VDD) to the interchangeable lens 100.

When the camera 10 shifts into the operating state, and the power VDD is supplied from the camera 10 to the interchangeable lens 100, the camera 10 and the interchangeable lens 100 communicates with each other. The camera microcomputer 20 instructs a lens microcomputer 211 to drive the lens driving unit 102 of the interchangeable lens 100 according to a camera operation by communicating instructions such as a focus control instruction and a diaphragm control instruction. At this time, the camera microcomputer 20 turns on a power source switch 33 by a CNT_VBAT signal before transmitting a signal corresponding to an instruction to drive the lens driving unit 102. Then, the camera 10 supplies the driving power (VM) to the interchangeable lens 100. After the driving of the lens driving unit 102 is completed, the camera microcomputer 20 receives information corresponding to the driving completion from the interchangeable lens 102. Then, the camera microcomputer 20 turns off the power source switch 33 by the CNT_VBAT signal. As a result, the camera 10 stops supplying the driving power (VM).

Capacitors C1 and C2 are connected to the respective lines of the communication control power (VDD) and the driving power (VM) in the lens control unit 103 to, for example, stabilize an operation of lens control and prevent electric elements from being broken due to static electricity.

When the power source switch 22 is turned on, the camera microcomputer 20 starts supplying the power VDD and VM from the camera 10 to the interchangeable lens 100. When the power source switch 22 is turned off, the camera microcomputer 20 stops supplying the power VDD and VM from the camera 10 to the interchangeable lens 100.

The camera microcomputer 20 communicates with the interchangeable lens 100 via a voltage conversion unit 23.

The camera microcomputer 20 includes an LCLK_OUT terminal for outputting a communication clock signal, a DCL_OUT terminal for outputting communication data to the interchangeable lens 100, and a DLC_IN terminal for receiving an input of communication data from the interchangeable lens 100. Further, the camera microcomputer 20 includes an MIF_IN terminal for detecting mounting of the interchangeable lens 100, a DTEF_IN terminal for identifying the type of the interchangeable lens 100, and a CNT_V_OUT terminal for outputting a communication voltage switching signal to the voltage conversion unit 23. Further, the camera microcomputer 20 includes a CNT_VDD_OUT terminal for outputting an energization signal of the power source switch 22, a connection terminal for a connection to the image processing unit 13, and a connection terminal for a connection to the operation input unit 17. An operation of the voltage conversion unit 23 will be described below.

A lens power source unit 214 converts the power VDD (a voltage V4) supplied from the camera 10 to the interchangeable lens 100 into a voltage V5. The microcomputer 211 within the lens control unit 103 (hereinafter referred to as a lens microcomputer) communicates with the camera microcomputer 20 via the above-described voltage conversion unit 23. The lens microcomputer 211 includes an LCLK_IN terminal for receiving an input of a communication clock signal, a DLC_OUT terminal for outputting communication data to the camera 10, a DCL_IN terminal for receiving an input of communication data from the camera 10, and a connection terminal for a connection to the lens driving unit 102.

Detection of mounting of the interchangeable lens 100 onto the camera 10 will be described. The MIF_IN terminal of the camera microcomputer 20 is pulled up to the power source via a resistance R2 (100 KΩ), so that the MIF_IN terminal is set to H (High) when the interchangeable lens 100 is not mounted. However, when the interchangeable lens 100 (the first interchangeable lens and the second interchangeable lens) is mounted, the MIF_IN terminal is connected to the ground GND at the interchangeable lens 100, so that the MIF_IN terminal is set to L (LOW) at the time of mounting of the interchangeable lens 100 regardless of the type of the interchangeable lens 100.

Figure 13A:
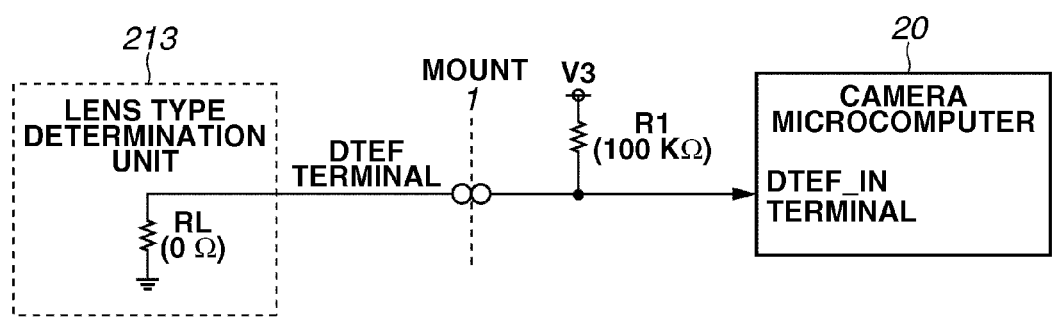
FIG. 13A is block diagram illustrating how lens type determination units of first and second interchangeable lenses are connected to a camera microcomputer according to the first exemplary embodiment.
Figure 13B:
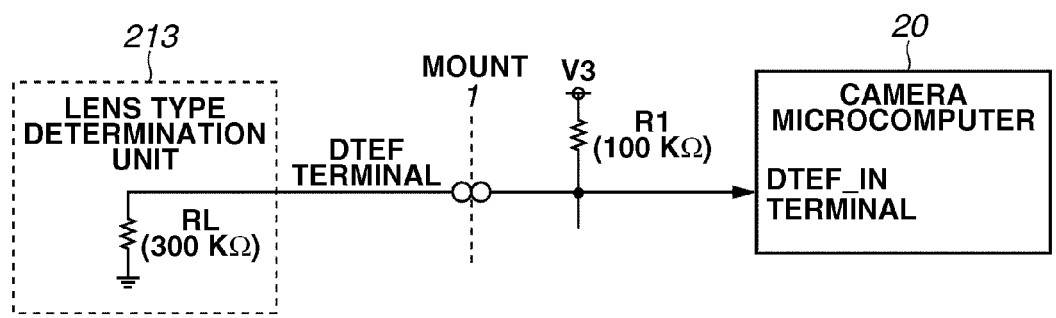
FIG. 13B is block diagram illustrating how lens type determination units of first and second interchangeable lenses are connected to a camera microcomputer according to the first exemplary embodiment.

An example of a configuration of a lens type determination unit 213 will be described with reference to FIG. 13. The lens type determination unit 213 includes a resistance RL disposed between the DTEF terminal provided at the mount 1 and the ground GND. A resistance value of the resistance RL is set to a value according to the type of the interchangeable lens 100 in advance. For example, 0Ω is set as the resistance RL disposed in the first interchangeable lens illustrated in FIG. 13A, and 300 KΩ is set as the resistance RL disposed in the second interchangeable lens illustrated in FIG. 13B.

In the camera 10, a resistance R1 (for example, 100 KΩ) is connected between the DTEF terminal of the mount 1 and the voltage (V3) of the operation power of the camera microcomputer 20. Further, the DTEF terminal is connected to the DTEF_IN terminal of the camera microcomputer 20. The DTEF_IN terminal of the camera microcomputer 20 has an AD conversion function (in the present exemplary embodiment, this function is an AD conversion function of 10 Bit).

An operation for determining the type of the interchangeable lens 100 by the camera microcomputer 20 will be described. The camera microcomputer 20 determines the type of the mounted interchangeable lens 100 according to a voltage value input into the DTEF_IN terminal. More specifically, the camera microcomputer 20 converts the input voltage value from analog data into digital data, and determines the type of the interchangeable lens 100 by comparing the AD converted value with a lens type determination reference stored in the camera microcomputer 20 in advance.

For example, when the first interchangeable lens is mounted, the AD converted value of the voltage input into the DTEF_IN terminal is determined as approximately "0x0000" from RL/(R1+RL), i.e., a resistance ratio between 100 KΩ of the resistance R1 and 0Ω of the resistance RL. Therefore, the camera microcomputer 20 detects that the AD converted value of the DTEF_IN terminal is within a range of "0x0000-0x007F", which is a reference for determining the type of the lens as the first interchangeable lens, and determines that the mounted interchangeable lens 100 is the first interchangeable lens. On the other hand, when the second interchangeable lens is mounted, the AD converted value of the voltage input into the DTEF_IN terminal is determined as approximately "0x02FF" from RL/(R1+RL), i.e., a resistance ratio between 100 KΩ of the resistance R1 and 300 KΩ of the resistance RL. Therefore, the camera microcomputer 20 detects that the AD converted value of the DTEF_IN terminal is within a range "0x0280-0x037F", which is a reference for determining the type of the lens as the second interchangeable lens, and determines that the mounted interchangeable lens 100 is the second interchangeable lens.

In the above description, 0Ω is set as the resistance value of the resistance RL for the first interchangeable lens. However, instead of using the resistance of 0Ω, the DTEF terminal may be directly connected to the ground GND.

Figure 14:
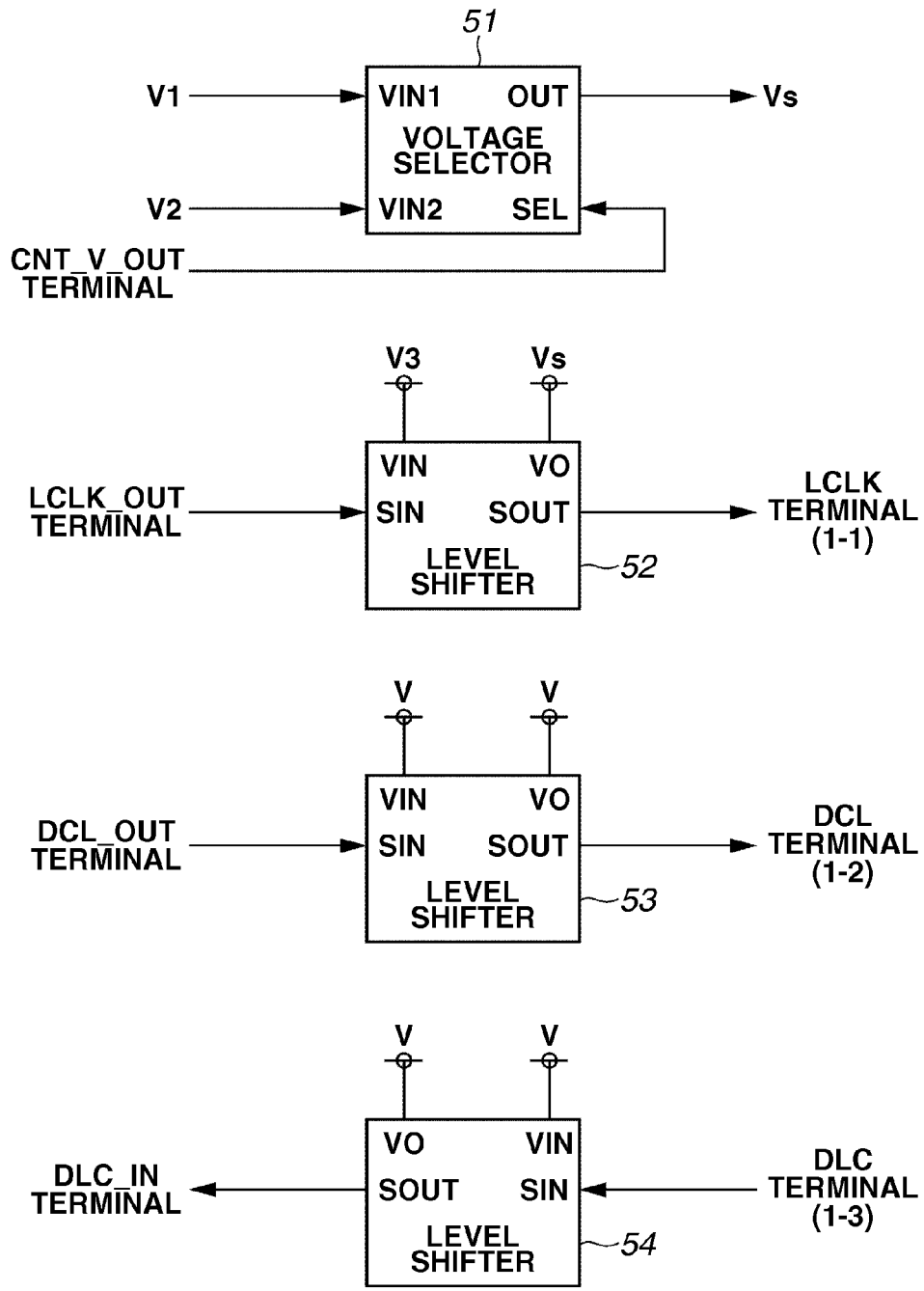
FIG. 14 is a block diagram illustrating a configuration of a voltage conversion unit according to the first exemplary embodiment.

FIG. 14 illustrates an example of a configuration of the voltage conversion unit 23. A voltage selector 51 has a function of outputting any one of two voltages input into a VIN1 terminal and a VIN2 terminal to an OUT terminal according to a logic of a SEL terminal. More specifically, when the SEL terminal is at the level L, the voltage selector 51 outputs the voltage of the VIN1 terminal. When the SEL terminal is at the level H, the voltage selector 51 outputs the voltage of the VIN2 terminal. The voltage V1, the voltage V2, and the CNT_V_OUT terminal of the camera microcomputer 20 are connected to the VIN1 terminal, the VIN2 terminal, and the SEL terminal, respectively. Hereinafter, an output of the OUT terminal will be referred to as $V_s$.

Level shifters 52, 53, and 54 have a function of outputting a signal input into an SIN terminal from an SOUT terminal while converting this signal from a voltage of a VIN terminal to a voltage of a VOUT terminal.

The LCLK_OUT terminal of the camera microcomputer 20 is connected to the SIN terminal of the level shifter 52, and the SOUT terminal is connected to the LCLK terminal of the mount 1. Further, the voltage V3 same as the voltage of the operation power of the camera microcomputer 20 is connected to the VIN terminal, and the voltage $V_s$ output from the voltage selector 51 is connected to the VOUT terminal. The DCL_OUT terminal of the camera microcomputer 20 is connected to the SIN terminal of the level shifter 53. The SOUT terminal is connected to the DCL terminal of the mount 1. The voltage V3 same as the voltage of the operation power of the camera microcomputer 20 is connected to the VIN terminal. The voltage $V_s$ output from the voltage selector 51 is connected to the VOUT terminal. The DLC terminal of the mount 1 is connected to the SIN terminal of the level shifter 54. The SOUT terminal is connected to the DLC_IN terminal of the camera microcomputer 20. The voltage $V_s$ output from the voltage selector 51 is connected to the VIN terminal. Further, the voltage V3 same as the voltage of the operation power of the camera microcomputer 20 is connected to the VOUT terminal. In this way, the voltage $V_s$ output from the voltage selector 51 (i.e., V1 or V2) is used as a communication voltage between the camera 10 and the interchangeable lens 100.

Next, a voltage switching operation by the voltage conversion unit 23 will be described. The camera microcomputer 20 controls the CNT_V_OUT terminal according to a logic table illustrated as Table 1.

TABLE 1

| MOUNTED LENS | FIRST INTER-CHANGE-ABLE LENS | SECOND INTER-CHANGE-ABLE LENS | RESERVED | NON-COMPLI-ANT LENS |
|---|---|---|---|---|
| DTEF_IN TERMINAL | 0x0000-0x007F | 0x0280-0x037F | 0x0080-0x027F | 0x0380-0x03FF |
| CNT_V_OUT TERMINAL | H OUTPUT | L OUTPUT | — | — |
| COMMU-NICATION VOLTAGE | V1 | V2 | NO COMMU-NICATION | NO COMMU-NICATION |

As described above, the camera microcomputer 20 determines the type of the mounted interchangeable lens 100 based on the voltage value (the AD converted value) input into the DTEF_IN terminal. Then, the camera microcomputer 20 controls a logic output from the CNT_V_OUT terminal according to the determination result about the type of the interchangeable lens 100. More specifically, in a case where the camera microcomputer 20 determines that the mounted interchangeable lens 100 is the first interchangeable lens from the voltage value of the DTEF_IN terminal, the camera microcomputer 20 outputs H from the CNT_V_OUT terminal to control the communication voltage to be the voltage V1. On the other hand, in a case where the camera microcomputer 20 determines that the mounted interchangeable lens 100 is the second interchangeable lens from the voltage value of the DTEF_IN terminal, the camera microcomputer 20 outputs L from the CNT_V_OUT terminal to control the control voltage to be the voltage V2.

In a case where the camera microcomputer 20 detects a voltage value, as the voltage value (the AD converted value) of the DTEF_IN terminal, in a range beyond the above-described references for determining the type of the lens as the first and second interchangeable lenses, the camera microcomputer 20 determines that the mounted lens is a "non-compliant lens", which is an interchangeable lens that the camera 10 does not support. Alternatively, presuming that it is a lens as to which which the camera microcomputer 20 cannot normally determine the type of the lens, the camera microcomputer 20 reserves the determination. In these cases, the camera microcomputer 20 does not communicate with the interchangeable lens 100.

Figure 15A:
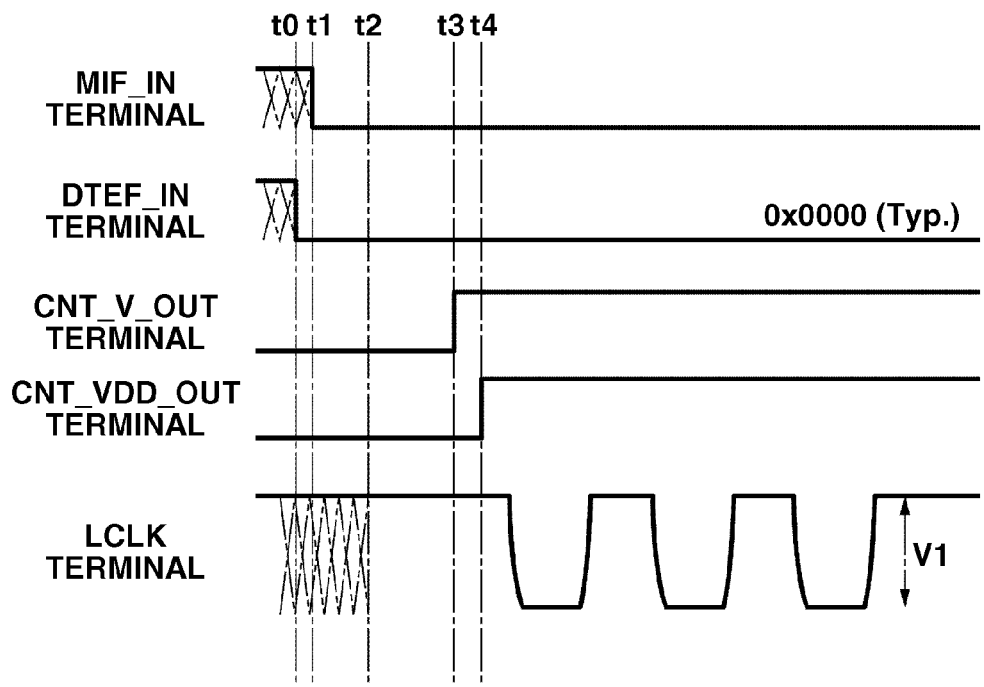
FIG. 15A is a timing chart illustrating an example of input/output timing at the camera microcomputer according to the first exemplary embodiment.
Figure 15B:
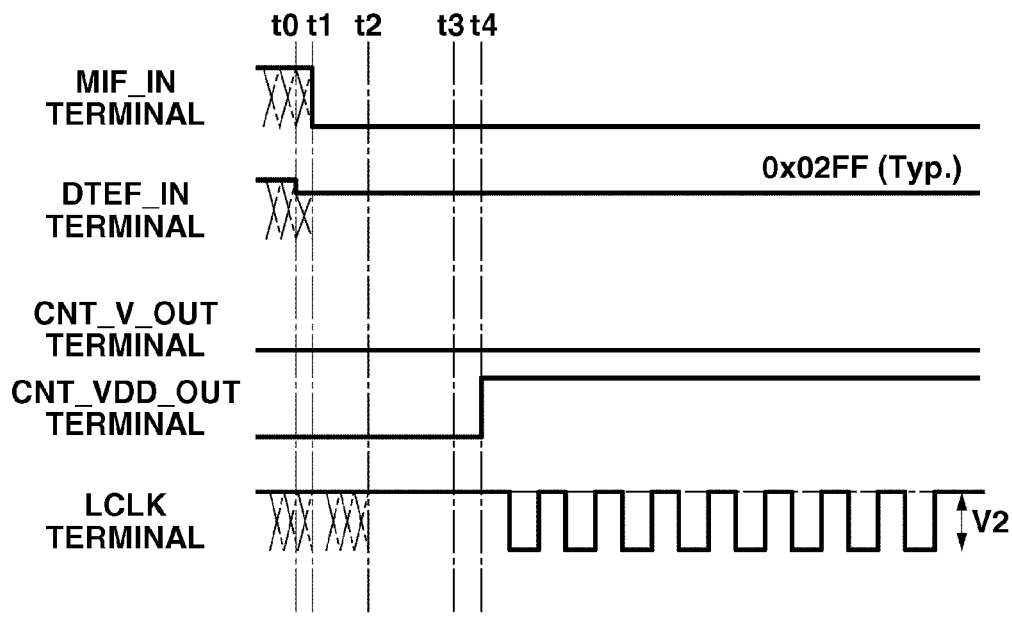
FIG. 15B is a timing chart illustrating an example of input/output timing at the camera microcomputer according to the first exemplary embodiment.

FIGS. 15A and 15B each illustrate an example of input and output timing of the MIF_IN terminal, the DTEF_IN terminal, the CNT_V_OUT terminal, and the CNT_VDD_OUT terminal of the camera microcomputer 20, and the LCLK terminal of the mount 1. FIG. 15A and FIG. 15B illustrate the timing when the first interchangeable lens is mounted, and the timing when the second interchangeable lens is mounted, respectively. Time t0 indicates timing at which the voltage is input into the DTEF_IN terminal during mounting of the lens. Time t1 indicates timing at which the voltage is input into the MIF_IN terminal during mounting of the lens. Further, time t2 indicates timing at which the camera 10 is started up (the power source is turned on). Time t3 indicates timing at which the type of the lens is determined, and the communication voltage is set. Time t4 indicates timing at which energization and communication to the mounted interchangeable lens 100 starts. Time t0 and time t1 may be simultaneous. Although timing at which the voltages are input into the DTEF_IN terminal and the MIF_IN terminal is time t0 and time t1 as described above, timing at which the camera microcomputer 20 reads the voltage value is in such an order that the camera microcomputer 20 reads the voltage value of the DTEF_IN terminal after the MIF_IN terminal is set to L.

Regardless of whether the first interchangeable lens is mounted or the second interchangeable lens is mounted, the voltage is input into the MIF_IN terminal after (or at the same time) the voltage is input into the DTEF_IN terminal (t0 and t1). Then, after the camera 10 is started up (t2), the lens type is determined, and the communication voltage is set according to the determination result (t3). After that, energization and communication to the interchangeable lens 100 starts (t4). The interchangeable lens 100 may be mounted on the camera 10 after the camera 10 is started up, but even in this case, the voltage is input into the MIF_IN after (or at the same time) the voltage is input into the DTEF_IN terminal, although the order of times t0, t1, and t2 are reversed.

To realize this operation (or control) at the time of lens mounting, the DTEF terminal should be connected at the mount 1 before (or at the same time) the MIF terminal is connected, regardless of whether the interchangeable lens 100 is the first interchangeable lens or the second interchangeable lens, and regardless of the timing at which the camera 10 is started up. The reason therefor is as follows. As described above, the camera microcomputer 20 reads the voltage value of the DTEF_IN terminal when the MIF_IN terminal is set to L. At this time, in a case where the DTEF terminal is not connected despite the shift of the MIF_IN terminal to L, the camera microcomputer 20 determines that the mounted interchangeable lens 100 is a non-compliant lens as described above, and the camera microcomputer 20 does not communicate with the interchangeable lens 100. Therefore, it should be ensured that the DTEF terminal is connected at the time that the MIF_IN terminal is set to L, to determine the type of the interchangeable lens 100 and communicate with the interchangeable lens 100 at an appropriate communication voltage.

<Regarding Alignment Sequence of Mount Terminals>

Next, an alignment sequence of the mount terminals, which is an important feature of the present invention, will be described in further detail with reference to FIG. 1C.

First, the MIF terminal is positioned at the utmost end, i.e., above the VDD terminal and the VBAT terminal as viewed in the sheet of FIG. 1C, a reason for which will be described now.

Assume that the MIF terminal is not located at this position. In this case, during the course of a rotation for mounting the interchangeable lens 100 (during the course of a movement (rotation) of the interchangeable lens 100 relative to the camera 10 in a mounting direction illustrated in FIG. 1C), the MIF terminal of the camera 10 contacts a terminal located in an opposite direction from the mounting direction (the lower side as viewed in the sheet of FIG. 1C) relative to the MIF terminal of the interchangeable lens 100. In a case where the terminal that the MIF terminal of the camera 10 contacts is the VDD or VM terminal, the MIF terminal of the camera 10 is pulled to the LOW side due to this contact. This is due to electric charges stored in a capacitor connected to a VDD or VM line of the interchangeable lens 100.

More specifically, as described above, it should be ensured that the DTEF terminal is connected when the MIF_IN terminal is set to L. However, it is possible that the camera 10 may start supplying the communication control power (VDD) to the interchangeable lens 100 when the MIF terminal of the camera 10 is pulled to the LOW side. This may result in not only wasteful consumption of power but also infliction of damage to an electric circuit of the interchangeable lens 100 due to a start of communication with an incorrect communication voltage. Further, a communication error may occur, and a latch-up of the camera 10, and an erroneous display may come out.

In this regard, even if the terminal closer to the edge than the MIF terminal does not have a capacitor capacity such as the communication control power (VDD) or the driving power (VM), this can only reduce the possibility that the MIF terminal is pulled to the LOW side for a moment, since there should be a parasitic capacity as long as there is a terminal and wiring.

Therefore, the MIF terminal is disposed at the utmost end, i.e., above the VDD terminal and the VBAT terminal as viewed in the sheet of FIG. 1C.

Next, a reason why the VDD terminal and the VM terminal are set as second and third camera-side contacts, and second and third camera accessory contacts, will be described now.

The VDD terminal and the VM terminal are terminals for supplying the communication control power (VDD) and the driving power (VM), and both are terminals relating to power supply. Generally, at these power terminals, a current passing therethrough has a relatively large current value. On the other hand, high contact impedance at a connected terminal leads to a significant reduction in the voltage. Accordingly, for the interchangeable lens 100, if the the voltage significantly drops, the voltage may fall below a voltage range allowing an operation of the electric circuit, leading to a malfunction of the interchangeable lens 100.

Further, in the interchangeable lens type camera, it is expected that, the more frequently the interchangeable lens thereof is changed, the more the camera-side contact is rubbed against the contact pin of the interchangeable lens, leading to wear of the contact and an increase in the contact impedance. As will be described below, the camera-side terminal is constituted by a contact pin, and is rubbed less frequently as the terminal is located closer to the edge (refer to FIG. 1C). In other words, during one operation of mounting the interchangeable lens 100, the camera-side MIF terminal, which is a first camera-side contact, contacts the accessory-side MIF terminal, which is a first camera accessory contact, but does not contact the other terminals. On the other hand, during one operation/process for mounting the interchangeable lens 100, the VDD terminal, which is a second camera-side contact, is rubbed against the accessory-side MIF and VDD terminals, which are first and second camera accessory contacts. During one operation/process for mounting the interchangeable lens 100, the VM terminal, which is a third camera-side contact, is rubbed against the accessory-side MIF, VDD, and VM terminals, which are the first, second, and third camera accessory contacts. In sum, it is more advantageous to position the camera-side contact for supplying power maximally closer to the edge in term of reliability of the contact and also in term of an expected number of change times of the interchangeable lens 100.

Therefore, the VDD terminal and the VM terminal are set as the second and third camera-side contacts, and the second and third camera accessory contacts.

Further, the VDD terminal is the second and the VM terminal is the third. The order is determined in such a manner in consideration of a circumstance at the time of mounting and dismounting the interchangeable lens 100. More specifically, regarding the interchangeable lens camera system, a user may change the interchangeable lens 100 quickly. Therefore, in some cases, the user may dismount the interchangeable lens 100 when the power source is turned on, when the lens driving unit 102 is in operation. Assume that the VM terminal and the VDD terminal are set as the second contact and the third contact, respectively, the second camera accessory contact VM and the third camera-side contact VDD may contact each other during the course of the mounting or dismounting of the interchangeable lens, establishing an electric contact therebetween. The lens driving unit 102 may not stop operating immediately, and a large current may flow through the second accessory contact VM, compared to a state when the lens driving unit 102 is not in operation. For the third camera-side contact VDD, a current as large as the VM terminal does not have to flow therethrough. Therefore, if a relatively large current flows through the circuit connected to the VDD terminal, this circuit may be damaged, and an installed current fuse may be burnt to prevent an unexpected current from flowing therethrough.

Therefore, in the present exemplary embodiment, the VDD terminal and the VM terminal are set as the second contact and the third contact, respectively. According to this positional arrangement, a current flowing through the third camera-side contact VM can be sufficiently smaller than a current expected to flow through the camera-side contact VM. This is because the terminals that contact each other during the course of mounting and dismounting of the interchangeable lens 100 are the VDD terminal, which is the second camera accessory contact, and the VM terminal, which is a third camera-side contact, and a current flowing through the VDD terminal is smaller than a current of the VM terminal that corresponds to a current required to drive the lens driving unit 102.

Further, during the course of mounting and dismounting of the interchangeable lens 100, the third camera accessory contact VM is connected to the fourth camera-side contact PGND. This does not cause any problem since even if the lens driving unit 102 may not stop operating immediately at the time of mounting and dismounting of the interchangeable lens 100, power supply runs out, so that the lens driving unit 102 only stops its operation.

Therefore, in the present exemplary embodiment, the VDD terminal is set as the second camera-side contact and the second camera accessory contact, and the VM terminal is set as the third camera-side contact and the third camera accessory contact.

Further, a large current flows between the terminal VM and the terminal PGND, as described above. Therefore, to minimize generation of a magnetic field due to a current loop, it is suitable to position pins to be adjacent to each other, which reduces a loop area. Therefore, in the present exemplary embodiment, the PGND terminal is set as the fourth camera-side contact and the fourth camera accessory contact.

The DCL terminal, the DLC terminal, and the LCLK terminal, which are signal pins that perform communication, are preferably disposed so as to be protected by a ground signal. That is because, if there are external noises, noises are added to the communication signal, causing a communication error and a malfunction. Therefore, in the present exemplary embodiment, the DCL terminal, the DLC terminal, and the LCLK terminal are set as the fifth contacts. The DGND terminal is set as the sixth contact. In this manner, the fifth contacts are sandwiched between the fourth and sixth ground signals to prevent interference of noises.

Next, a configuration of a camera-side connector including the camera-side contact pins, which constitute the camera-side terminals at the mount 1, and a configuration of a lens-side connector including lens-side contact patterns (accessory-side contact surfaces), which constitute the lens-side terminals at the mount 1, will be described.

Figure 2B:
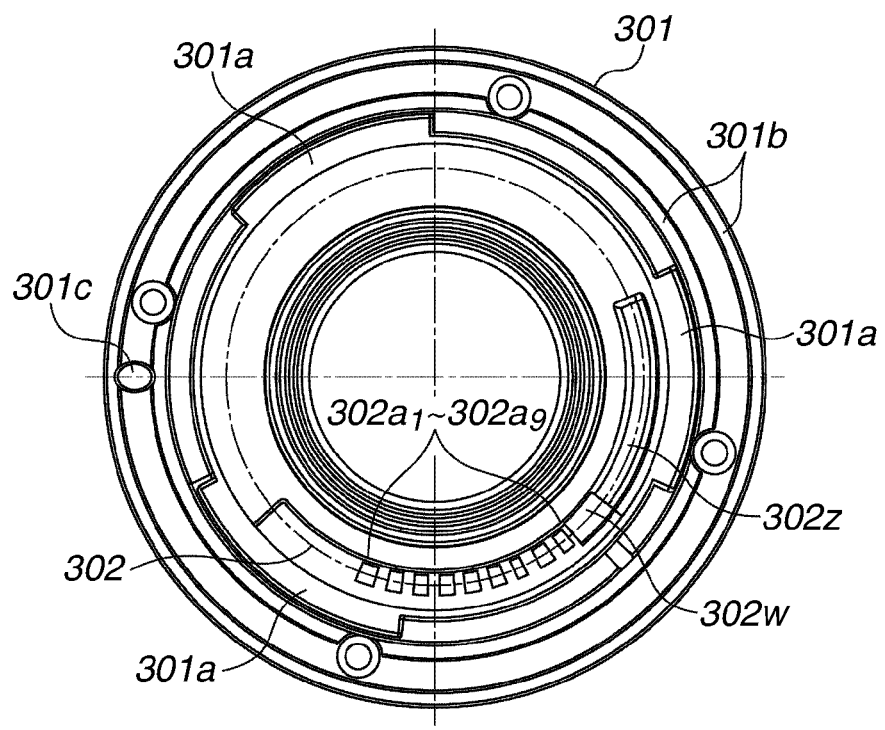
FIG. 2B illustrates a configuration of mounts and connectors disposed in the interchangeable lens according to the first exemplary embodiment and the above-described camera.
Figure 3A:
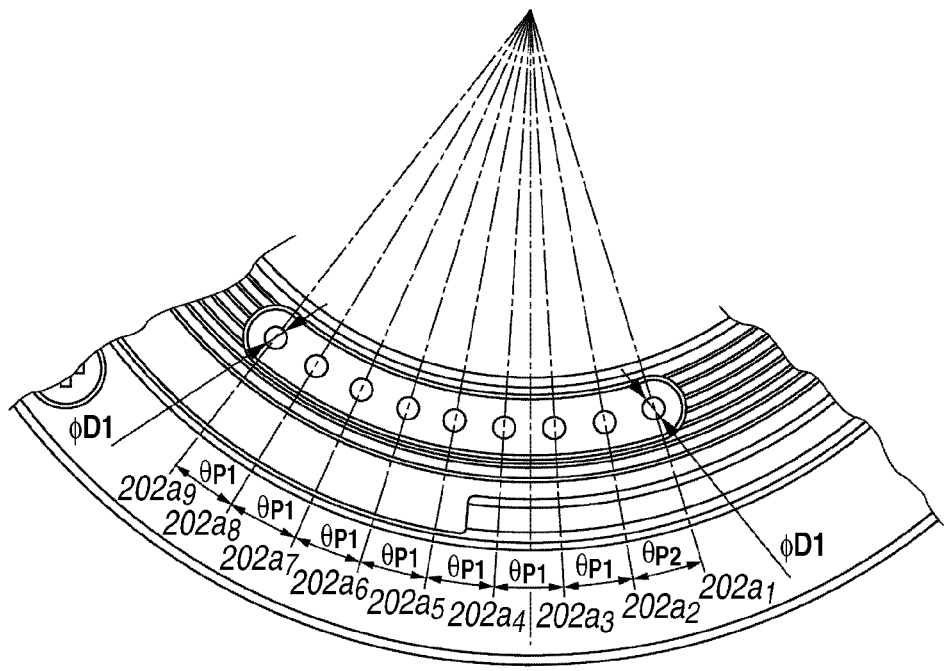
FIG. 3A is an enlarged view of the above-described connectors.
Figure 3B:
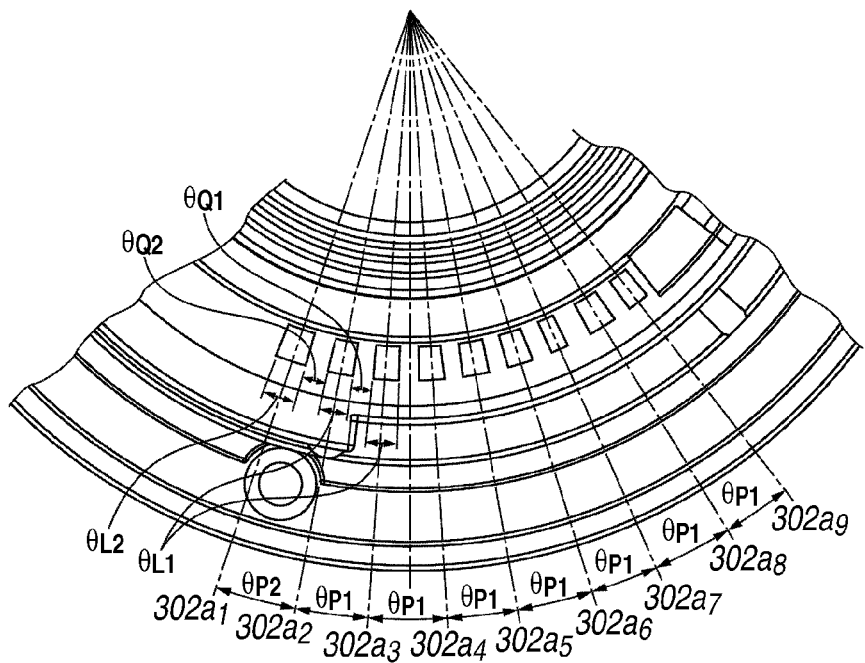
FIG. 3B is an enlarged view of the above-described connectors.
Figure 4:
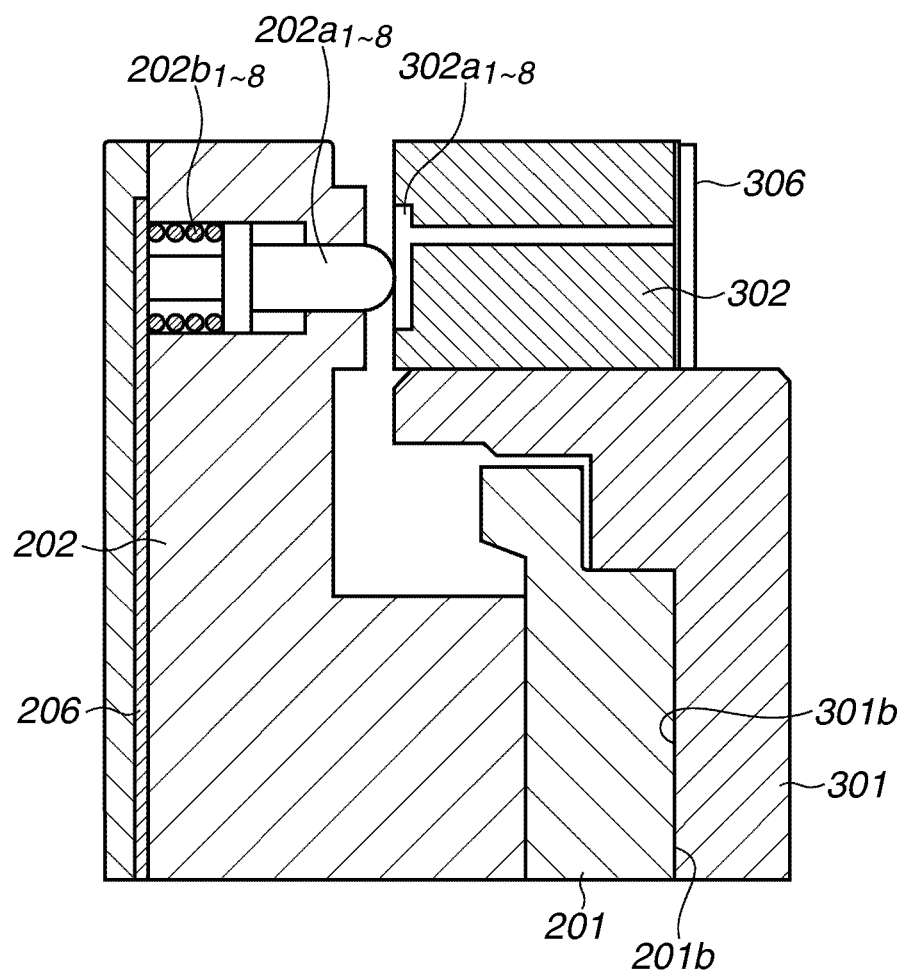
FIG. 4 is a cross-sectional view of the above-described connectors.

FIG. 2A illustrates a camera-side mount 201 as viewed from a front side (an object side) of an optical axis direction, and FIG. 3A illustrates an enlarged view of the camera-side connector (a camera-side contact seat 202 and camera-side contact pins $202a_1$ to $202a_9$) disposed in the camera-side mount 201. FIG. 2B illustrates a lens-side mount 301 as viewed from aback side (an image plane side) of the optical axis direction, and FIG. 3B illustrates an enlarged view of the lens-side connector (a lens-side contact seat 302 and lens-side contact patterns $302a_1$ to $302a_9$) disposed in the lens-side mount 301. Further, FIG. 4 illustrates cross sections of the camera-side connector and the lens-side connector in a coupling completion state.

The camera-side mount 201 is fixed to a front end of a not-illustrated camera main body (a chassis). The camera-side mount 201 includes a ring-shaped mount reference surface 201b for securing a predetermined flange focal length at a front end on an outer circumferential side of the camera-side mount 201. Then, the camera-side mount 201 includes camera-side bayonet teeth 201a at three positions in a circumferential direction (hereinafter referred to as amount circumferential direction) in an inner side relative to the mount reference surface 201b. Further, a lock pin 205 for positioning the camera-side mount 201 in a relative rotational direction with the lens-side mount 301 is provided at the camera-side mount 201 to project and retract to and from the mount reference surface 201b.

The lens-side mount (the accessory-side mount) 301 is fixed to a back end of the not-illustrated interchangeable lens 100. The lens-side mount 301 includes a mount reference surface 301b, which is a reference surface in the optical axis direction, at a back end of an outer circumferential side of the lens-side mount 301. The lens-side mount 301 includes lens-side bayonet teeth (accessory-side bayonet teeth) 301a at three positions in a circumferential direction (the mount circumferential direction) in an inner side relative to the mount reference surface 301b. Further, a lock hole 301c, which the lock pin 205 of the camera-side mount 201 is inserted in, is formed at the lens-side mount 301 to open on the mount reference surface 301b. The lock hole 301c is an elongated hole having an inner diameter that allows the lock hole 301c to be engaged with the lock pin 205 with almost no backlash relative to the lock pin 205 in the mount circumferential direction (the relative rotational direction), and having an inner diameter longer to some degree than the outer diameter of the lock pin 205 in a radial direction of the lens-side mount 301 (hereinafter referred to as a mount radial direction). This size of the lock hole 301c allows the lock pin 205 to be inserted smoothly in the lock hole 301c when the interchangeable lens 100 is mounted (the interchangeable lens 100 is rotated relative to the camera 10).

The camera-side contact seat (a camera-side contact holding portion) 202, which holds the nine camera-side contact pins $202a_1$, $202a_2$, . . . , $202a_9$ disposed in the mount circumferential direction, is formed in a part of an area on the inner side relative to the bayonet teeth 201a in the camera-side mount 201. As illustrated in FIG. 4, the camera-side contact pins $202a_1$ to $202a_9$ are inserted in pin holding holes formed at the camera-side contact seat 202 to project forward and retract backward (movable in a projecting/retracting direction). A flexible printed wiring board 206 is disposed in a bottom surface of each of the pin holding holes. Then, contact springs ($202b_1$, $202b_2$, . . . $202b_9$), which bias the camera-side contact pins $202a_1$, $202a_2$, . . . $202a_9$ in a direction projecting forward from the camera-side contact seat 202, are disposed between the flexible printed wiring board 206 and flanges of the respective camera-side contact pins $202a_1$, $202a_2$, . . . $202a_9$.

The camera-side contact pins $202a_1$ to $202a_9$ are connected in this order to the DTEF terminal, the DGND terminal, the LCLK terminal, the DLC terminal, the DCL terminal, the PGND terminal, the VBAT terminal, the VDD terminal, and the MIF terminal described with reference to FIG. 1B.

The camera-side connector is constituted by the above-described camera-side contact seat 202, the camera-side contact pin 202a, (n=1 to 9, and the same applies to "n" in the following description), the contact spring $202b_n$, and the flexible printed wiring board 206.

The lens-side contact seat (an accessory-side contact holding portion) 302 is formed in a part of an area on the inner side of the bayonet teeth 301a at the lens-side mount 301. The lens-side contact seat 302 holds the nine rectangular lens-side contact patterns $302a_1$, $302a_2$, . . . $302a_9$ disposed in the mount circumferential direction. The shape of the lens-side contact patterns $302a_1$ to $302a_9$ may be another shape than a rectangular shape, such as a circular shape.

The lens-side contact patterns $302a_1$ to $302a_9$ are connected to an L_CPU 151 illustrated in FIG. 1 via a flexible printed wiring board 306. A recess 302z is formed at a portion adjacent to a portion of the lens-side contact seat 302 that holds the lens-side contact patterns $302a_1$, $302a_2$, . . . $302a_9$ (hereinafter referred to as a pattern holding portion). The recess 302z is recessed forward beyond the pattern holding portion. Further, a slope surface 302w is formed between the pattern holding portion and the recess 302z. In the following description, the term. "lens-side contact seat 302" will be used to collectively refer to the portion of the lens-side contact seat 302 that holds the lens-side contact patterns $302a_1$ to $302a_9$, and the lens-side contact patterns $302a_1$ to $302a_9$.

The lens-side contact patterns $302a_1$ to $302a_9$ correspond to the camera-side contact pins $202a_1$ to $202a_9$ connected to the DTEF terminal, the DGND terminal, the LCLK terminal, the DLC terminal, the DCL terminal, the PGND terminal, the VBAT terminal, the VDD terminal, and the MIF terminal, in this order.

The lens-side connector is constituted by the above-described lens-side contact seat 302 (including the recess 302z and the slope surface 302w), the lens-side contact pattern 302a, (n=1 to 9, and the same applies to "n" in the following description), and the flexible printed wiring board 306.

The camera-side contact pin 202a, and the lens-side contact pattern 302a, are paired in contact with each other in the coupling completion state between the camera 10 and the interchangeable lens 100. In mounting the interchangeable lens 100, the lens-side contact seat 302 (including the lens-side contact pattern $302a_n$, as described above) contacts the camera-side contact pin $202a_n$, whereby the camera-side contact pin $202a_n$ is pushed in against the camera-side contact seat 202 while charging the contact spring $202b_n$. As a result, the camera-side contact pin $202a_n$ is set into pressure contact with the lens-side contact pattern $302a_n$ corresponding thereto, thereby establishing an electric contact between the camera 10 and the interchangeable lens 100.

FIGS. 5(1) to (8) illustrate processes when the lens-side connector is being connected to the camera-side connector during mounting of the interchangeable lens 100. The relationships between the above-described lock pin 205 and lock hole 301c in the states indicated by FIGS. 5(1) to (8) are also illustrated at the right sides of FIGS. 5(1) to (8).

FIG. 5(1) illustrates a state in which the lens-side mount 301 is moved closer to the camera-side mount 201 in the optical axis direction until each of the lens-side bayonet teeth 301a are almost inserted between two of the camera-side bayonet teeth 201a. Hereinafter, the state illustrated in FIG. 5(1) will be referred to as a before-mount abutment state. FIG. 5(2) illustrates a state in which each of the lens-side bayonet teeth 301a is inserted between the camera-side bayonet teeth 201a, and the lens-side mount 301 (the mount reference surface 301b) is in abutment with the camera-side mount 201 (the mount reference surface 201b) in the optical axis direction. Hereinafter, the state indicated in FIG. 5(2) will be referred to as a mount abutment state (a first state).

FIGS. 5(3) to (7) indicate ongoing states when the lens-side mount 301 is being rotated relative to the camera-side mount 201 from the mount abutment state toward the coupling completion state (a second state) (during a relative rotation; hereinafter referred to as ongoing rotational states), step by step. FIG. 5(8) indicates a state that the lens-side mount 301 is rotated relative to the camera-side mount 201 until the coupling completion state is established.

In the mount abutment state illustrated in FIG. 5(2), the pattern holding portion of the lens-side contact seat 302 (the lens-side contact pattern $302a_9$ or the vicinity thereof) is in abutment with the camera-side contact pin $202a_1$. As a result, the camera-side contact pin $202a_1$ is pushed to the camera-side contact seat 202 compared to the before-mount abutment state illustrated in FIG. 5(1).

Hereinafter, among the plurality of camera-side contact pins 202a, (n camera-side contact pins $202a_1$ to $202a_n$), the camera-side contact pin $202a_1$ for the DTEF terminal, which is in abutment with the lens-side contact seat 302 in the mount abutment state, will be also referred to as a first camera-side contact pin. Further, the camera-side contact pins other than the first camera-side contact pin, i.e., the camera-side contact pins $202a_2$ to $202a_9$, which are not in abutment with the lens-side contact seat 302 in the mount abutment state, will be also referred to as second camera-side contact pins. Among them, the camera-side contact pin $202a_9$ for the MIF terminal is a specific second camera-side contact pin.

In the mount abutment state, the lock pin 205 is pushed in by the mount reference surface 301b of the lens-side mount 301 at a position away from the lock hole 301c. Therefore, the lens-side mount 301 can be rotated relative to the camera-side mount 201 after that.

The engagement between the lens-side bayonet teeth 301a and the camera-side bayonet teeth 201a is completed during processing from the mount abutment state illustrated in FIG. 5(2) until the coupling completion state illustrated in FIG. 5(8) via the ongoing rotational states illustrated in FIGS. 5(3) to (7). During these processes, the lens-side contact seat 302 also pushes in the second the camera-side contact pins $202a_2$ to $202a_9$ against the camera-side contact seat 202 while sliding relative to the camera-side contact pins $202a_1$ to $202a_9$. As a result, finally, in the coupling completion state illustrated in FIG. 5(8), the camera-side contact pin 202a, and the lens-side contact pattern 302a, corresponding thereto are in contact (pressure contact) with each other.

Further, in the coupling completion state, the positions of the lock pin 205 and the lock hole 301c in the mount circumferential direction correspond with each other, whereby the lock pin 205, which protrudes from the mount reference surface 201b of the camera-side mount 201, is inserted into the lock hole 301c of the lens-side mount 301. As a result, the coupling completion state is maintained until the lock pin 205 is released from the lock hole 301c by a not-illustrated unlocking mechanism.

The camera-side contact pin 202a, and the lens-side contact pattern 302a, come to contact with each other during the ongoing rotation illustrated in FIGS. 5(4) to (7), a flow of which will be described with reference to FIG. 6.

In the present exemplary embodiment, the term "pin contact position" will be used to refer to a contact position of the camera-side contact pin 202a, on the lens-side contact pattern 302a, in the coupling completion state. A pitch of the lens-side contact pattern 302a, corresponds to a distance between the pin contact positions on adjacent contact patterns.

Further, $La_n$ ($La_1$ to $La_9$) is a distance between the pin contact position on the lens-side contact pattern $302a_n$ and a left end of the lens-side contact pattern $a_n$ viewed in FIGS. 6A to 6E (i.e., the leading edge in the direction in which the lens-side contact pattern $302a_n$ moves relative to the camera-side contact pattern $202a_n$). In this case, $La_1$ to $La_9$ are set so as to have the following relationship: $La_1 > La_2, La_3, La_4, La_5, La_6, La_8 > La_9 > La_7$.

This relationship can be rephrased in the following manner, focusing on, for example, the lens-side contact patterns $302a_1$ and $302a_9$ and the camera-side contact patterns $202a_1$ and $202a_9$. $L_A$ is a distance between a position of a portion of the lens-side contact pattern $302a_1$ where the lens-side contact pattern $302a_1$ starts contacting the camera-side contact pin $202a_1$ during the ongoing rotation, and a position of a portion of the lens-side contact pattern $302a_9$ where the lens-side contact pattern $302a_9$ starts contacting the camera-side contact pin $202a_9$ during the ongoing rotation, in the mount circumferential direction. The phrase "portion where the lens-side contact pattern $302a_n$ starts contacting the camera-side contact pin $202a_n$" means, for example, a side of a rectangle if the contact pattern has a rectangular shape, or a top of a circular arc if the contact pattern has a circular shape. The distance in the mount circumferential direction can be also referred to as an angle. Further, $L_B$ is a distance (angle) between the camera-side contact pins $202a_1$ and $202a_9$ (the central axes thereof) in the mount circumferential direction. In this case, the distance $L_A$ is shorter than the distance $L_B$ (in other words, the distance $L_B$ is longer than the distance $L_A$).

Figure 6A:
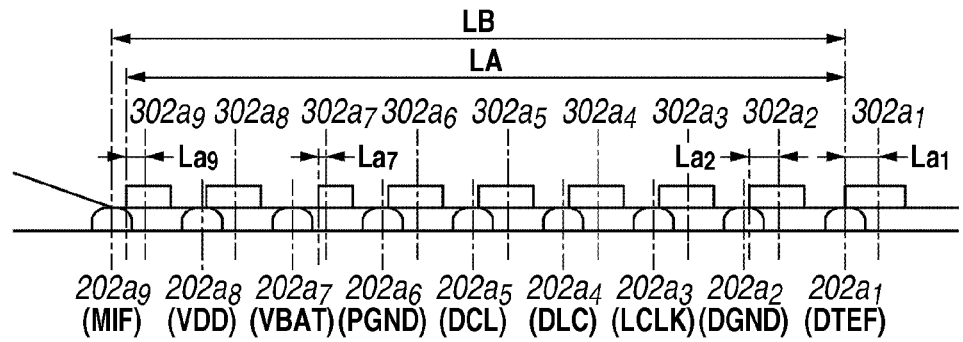
FIG. 6A is an enlarged view of FIG. 5(4).

When the lens-side mount 301 is rotated from the state illustrated in FIG. 5(3), first, the camera-side contact pin (the pin for the DTEF terminal) $202a_1$ and the lens-side contact pattern $302a_1$ (the pattern for the DTEF terminal) start contacting each other, as illustrated in FIG. 6A. At this time, since the distances $La_1$ to $La_9$ (in other words, $La_A$ and $La_B$) have the above-described relationship, the other camera-side contact pins $202a_2$ to $202a_9$ and the lens-side contact patterns $302a_2$ to $302a_9$ do not contact each other.

Figure 6B:
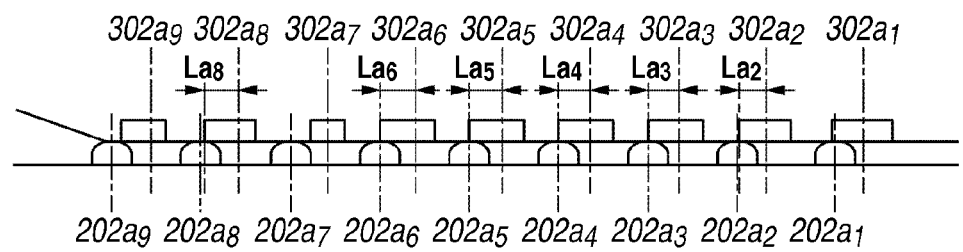
FIG. 6B is an enlarged view of FIGS. 5(5).

When the lens-side mount 301 is further rotated from the state illustrated in FIG. 6A, the camera-side contact pins $202a_2$ to $202a_6$ and $202a_8$, and the lens-side contact patterns $302a_2$ to $302a_6$ and $302a_8$ start contacting each other at the same time, as illustrated in FIG. 6B (FIG. 5(5)). At this time, the camera-side contact pins $202a_7$ and $202a_9$ and the lens-side contact patterns $302a_7$ and $302a_9$ do not contact each other.

Figure 6C:
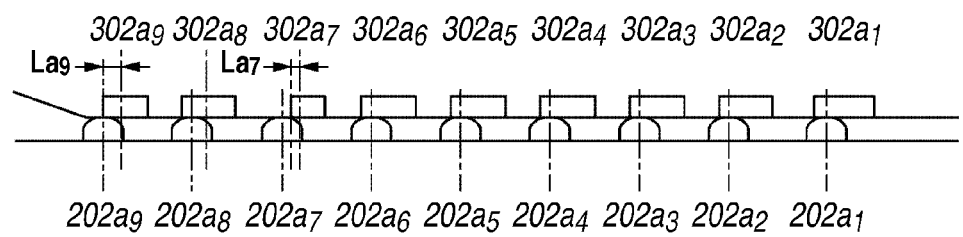
FIG. 6C is an enlarged view of FIGS. 5(6).

When the lens-side mount 301 is further rotated from the state illustrated in FIG. 6B, the camera-side contact pin (the pin for the MIF terminal) $202a_9$ and the lens-side contact pattern (the pattern for the MIF terminal) $302a_9$ start contacting each other, as illustrated in FIG. 6C (FIG. 5(6)). At this time, since the relationship between the distance $La_9$ and $La_7$ is $La_9 > La_7$, the camera-side contact pin $202a_7$ and the lens-side contact pattern $302a_7$ do not contact each other.

Figure 6D:
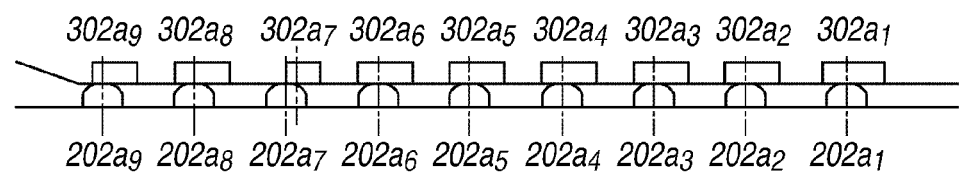
FIG. 6D is an enlarged view of FIGS. 5(7).

When the lens-side mount 301 is further rotated from the state illustrated in FIG. 6C, the camera-side contact pin (the pin for the VBAT terminal) $202a_7$ and the lens-side contact pattern (the pattern for the VBAT terminal) $302a_7$ start contacting each other, as illustrated in FIG. 6D (FIG. 5(7)).

Figure 6E:
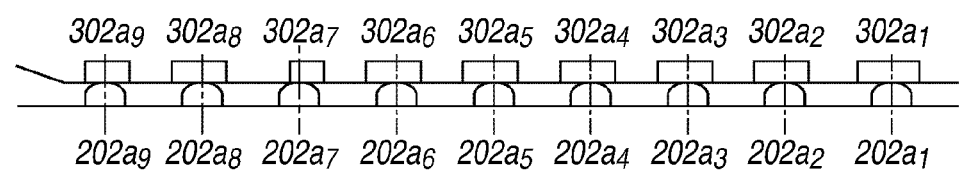
FIG. 6E is an enlarged view of FIGS. 5(8).

Then, when the lens-side mount 301 is further rotated from the state illustrated in FIG. 6D, the lens-side mount 301 and the camera-side mount 201 are set into the coupling completion state, as illustrated in FIG. 6E (FIG. 5(8)).

As described above, in the present exemplary embodiment, the camera-side contact pins $202a_1$ to $202a_9$ and the lens-side contact patterns $302a_1$ to $302a_9$ contact each other in descending order of the distance $La_n$, and the camera-side contact pin $202a_1$ constituting the DTEF terminal, and the lens-side contact pattern $302a_1$ corresponding thereto start contacting each other first.

The distances $L_A$ and $L_B$ may be a same distance. In this case, the distance $L_A$ is increased to match the distance $L_B$ so as to synchronize the timing at which the pin for the DTEF terminal contacts the pattern for the DTEF terminal with the timing at which the pin for the MIF terminal contacts the pattern for the MIF terminal. At this time, the width of the lens-side contact pattern $302a_1$ in the circumferential direction may be increased at a portion opposite to the portion where the lens-side contact pattern $302a_1$ starts contacting the camera-side contact pin $202a_1$ (the right direction as viewed in FIGS. 6A to 6F). In a case where the distances $L_A$ and $L_B$ are the same, when the lens-side mount 301 is rotated from the state illustrated in FIG. 5(3), the camera-side contact pins $202a_1$ and $202a_9$ for the DTEF terminal and the MIF terminal, and the lens-side contact patterns $302a_1$ and $302a_9$ corresponding thereto start contacting each other at the same time, respectively.

Next, a problem with the first camera-side contact pin $202a_1$ and a method for solving the problem will be described. In a case where the lens-side mount 301 is rushed into abutment with the camera-side mount 201 when the lens-side mount 301 is moved from the before-mount abutment state into the mount abutment state, the lens-side contact seat 302 hits the first camera-side contact pin $202a_1$ strongly. The first camera-side contact pin $202a_1$ is inserted in hole of the camera-side contact seat 202 movably holding the pin (i.e., having a backlash of fitting which allows a movement). Therefore, due to an impact from this hitting, the first camera-side contact pin $202a_1$ may be deformed, for example, being inclined or bent from a position erected almost straight along the optical axis direction corresponding to a fitting backlash amount between the first camera-side contact pin $202a_1$ and the pin holding hole. In this case, even when the coupling completion state is established, the first camera-side contact pin $202a_1$ and the lens-side contact pattern $302a_1$ corresponding thereto may not contact each other normally, causing a communication error between the camera 10 and the interchangeable lens 100, and short circuit of power supply.

Therefore, in the present exemplary embodiment, the width of the lens-side contact pattern $302a$, in the mount circumferential direction, the height of the lens-side contact pattern $302a$, in the mount radial direction, the pitch and the distance between the lens-side contact patterns $302a_n$, the pitch between the camera-side contact pins $202a_n$, and the diameter of the camera-side contact pin $202a$, are set as follows.

<<Regarding Width and Height of Lens-Side Contact Pattern (Accessory-Side Contact Surface)>>

Figure 7A:
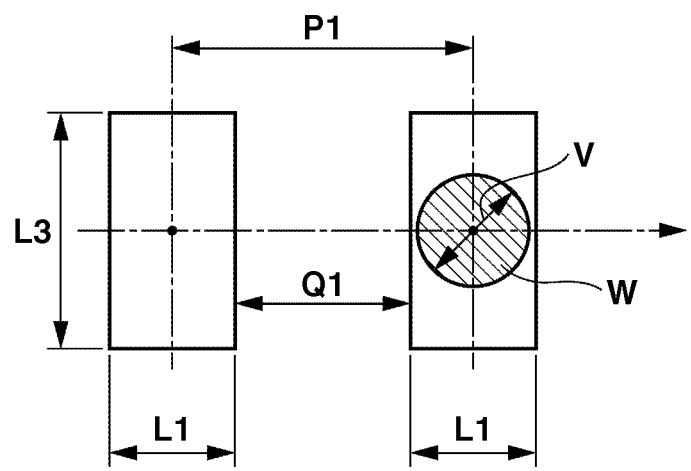
FIG. 7A illustrates lens-side contact patterns according to the first exemplary embodiment.
Figure 8A:
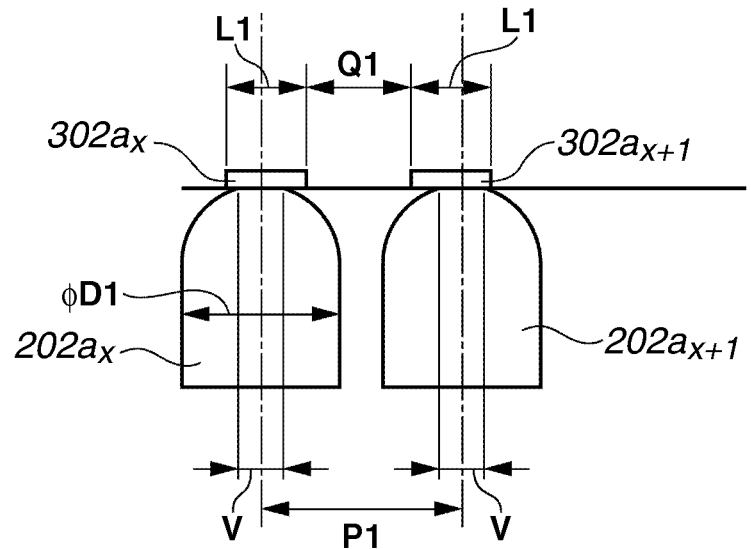
FIG. 8A illustrates camera-side contact pins in a coupling completion state according to the first exemplary embodiment.

Hereinafter, the lens-side contact patterns $302a_2$ to $302a_9$ making pairs with the respective second camera-side contact pins $202a_2$ to $202a_9$ (hereinafter also referred to as "corresponding to" the pins) will be referred to as second lens-side contact patterns (second accessory-side contact surfaces). The lens-side contact pattern $302a_9$ for the MIF terminal corresponds to a specific second accessory-side contact surface. As illustrated in FIGS. 7A and 8A, the widths of these second lens-side contact patterns $302a_2$ to $302a_9$ are set to a width L1. In FIGS. 7A and 8A, the second camera-side contact pin is labeled as $202a_X$, and the second camera-side contact pins adjacent to each other are labeled as $202a_X$ and $202a_{X+1}$. Further, the second lens-side contact pattern corresponding to the second camera-side contact pin $202a_X$ is labeled as $302a_X$, and the second lens-side contact patterns adjacent to each other are labeled as $302a_X$ and $302a_{X+1}$.

As illustrated in FIG. 8A, the width L1 is set so as to be longer by a predetermined allowance amount than a diameter V of a range W where the second camera-side contact pin $202a_X$ in a state erected almost straight along the optical axis direction without being deformed contacts the second lens-side contact pattern $302a_X$. The tip of the second camera-side contact pin $202a_X$ is worn due to repeated sliding against the lens-side contact pattern $302a_n$ when the interchangeable lens 100 is mounted and dismounted. Therefore, the range W, where the second camera-side contact pin $202a_X$ contacts the second lens-side contact pattern $302a_X$, is also set in consideration of this wear. At the tip of the second camera-side contact pin $202a_X$, the portion that contacts the second lens-side contact pattern $302a_X$ has the width (diameter) V.

Further, as illustrated in FIG. 7A, the height of the second lens-side contact pattern $302a_X$ is set to a height L3.

Figure 7B:
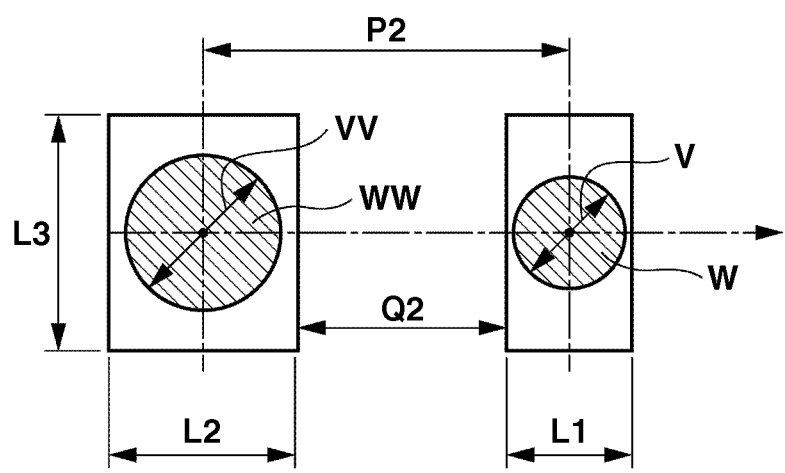
FIG. 7B illustrates lens-side contact patterns according to the first exemplary embodiment.
Figure 8B:
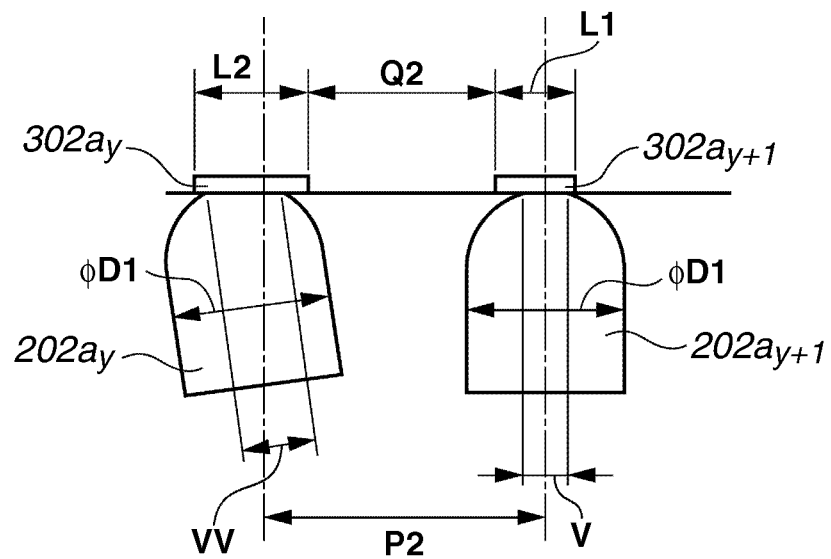
FIG. 8B illustrates camera-side contact pins in a coupling completion state according to the first exemplary embodiment.

On the other hand, hereinafter, the lens-side contact pattern $302a_1$, which makes a pair with (corresponds to) the first camera-side contact pin $202a_1$ for the DTEF terminal, will be referred to as a first lens-side contact pattern (a first accessory-side contact surface). As illustrated in FIGS. 7B and 8B, the width of this first lens-side contact pattern $302a_1$ is set to a width L2, which is wider than the width L1. In FIGS. 7B and 8B, the first camera-side contact pin is labeled as $202a_Y$, and the first and second camera-side contact pins placed adjacent to each other are labeled as $202a_Y$ and $202a_{Y+1}$. Further, the first lens-side contact pattern corresponding to the first camera-side contact pin $202a_Y$ is labeled as $302a_Y$, and the first and second lens-side contact patterns placed adjacent to each other are labeled as $302a_Y$ and $302a_{Y+1}$.

FIG. 8B illustrates the first camera-side contact pin $202a_Y$ with the tip thereof displaced by being inclined or deformed from its original state erected almost straight along the optical axis direction. As illustrated in FIG. 8B, the width L2 is set so as to be longer by a predetermined allowance amount than a diameter VV of a range WW where the first camera-side contact pin $202a_y$ with its tip displaced can contact the first lens-side contact pattern $302a_y$ (hereinafter also referred to as an estimated contact range). The estimated contact range WW is a range corresponding to an amount that is estimated according to its design to be an amount by which the tip of the first camera-side contact pin $202a_y$ can be displaced, and is a range based on which, for example, if the tip of the first camera-side contact pin $202a_y$ is displaced beyond the estimated contact range WW, it is determined that a failure or abnormality occurs.

The tip of the first camera-side contact pin $202a_y$ is also worn due to repeated sliding against the lens-side contact pattern $302a_y$ when the interchangeable lens 100 is mounted and dismounted. Therefore, the range WW where the first camera-side contact pin $202a_y$ can contact the first lens-side contact pattern $302a_y$ (the estimated contact range) is also designed in consideration of this wear. At the tip of the first camera-side contact pin $202a_y$, the portion that contacts the first lens-side contact pattern $302a_y$ has the width (diameter) VV.

Further, as illustrated in FIG. 7B, the height of the first lens-side contact pattern $302a_y$ is set to the height L3, which is the same as the height of the second lens-side contact pattern $302a_x$. In the present exemplary embodiment, the height L3 of the respective lens-side contact patterns $302a_x$ and $302a_y$ is longer than the widths L1 and L2. However, the height L3 may be equal to the width L1 or L2, or may be shorter than the width L1 or L2.

FIGS. 7A and 7B each illustrate that the pin contact position is located at almost a center of the lens-side contact pattern $302a_x$ or $302a_y$ in the radial direction and the circumferential direction as a schematic view. However, the pin contact position does not have to be located at the center in the radial direction and the circumferential direction. In the present exemplary embodiment, as illustrated in FIG. 6E, each pin contact position is located displaced from the center of the lens-side contact pattern 302a, in the radial direction.

In this way, in the present exemplary embodiment, the width of the first lens-side contact pattern $302a_y$ corresponding to the first camera-side contact pin $202a_y$ where an inclination and a deformation can occur is set to be wider than the width of the second lens-side contact pattern $302a_x$ corresponding to the second camera-side contact pin $202a_x$ where an inclination and a deformation unlikely occurs. As a result, a normal contact (an electric contact) between the first camera-side contact pin $202a_y$ ($202a_1$) and the first lens-side contact pattern $302a_y$ ($302a_1$) can be secured even if the first camera-side contact pin $202a_y$ ($202a_1$) is inclined or deformed due to abutment (hitting) on the lens-side contact seat 302. Therefore, it is possible to prevent occurrence of a communication error between the camera 10 and the interchangeable lens 100, and the short circuit of power supply.

FIG. 3B indicates the widths L1 and L2 as angular ranges $\theta L_1$ and $\theta L_2$ on the lens-side contact seat 302 circularly formed at the lens-side mount 301.

<<Regarding Pitch and Distance Between Lens-Side Contact Patterns (Accessory-Side Contact Surfaces), and Pitch Between Camera-Side Contact Pins>>

As illustrated in FIGS. 7A and 8A, the pitch and distance between the second lens-side contact patterns $302a_x$ and $302a_{x+1}$ ($302a_2$ to $302a_9$) are set to a pitch P1 and a distance Q1, respectively. This pitch between the lens-side contact patterns corresponds to a distance between the pin contact positions on adjacent contact patterns. Further, the distance between the lens-side contact patterns corresponds to a distance between a certain lens-side contact pattern and a lens-side contact pattern adjacent thereto in the mount circumferential direction (a distance between the sides, if the contact patterns have rectangular shapes). This distance between the lens-side contact patterns is important in a contact between the lens-side contact pattern and the camera-side contact pin. Further, the pitch between the second camera-side contact pins $202a_x$ and $202a_{x+1}$ (the distance between the pin central axes) is also set to the pitch P1 according to the pitch P1 between the second lens-side contact patterns $302a_x$ and $302a_{x+1}$.

The pitch P1 and the distance Q1 are determined to further satisfy the following conditions, provided that the range W is the range of the second camera-side contact pin $202a_x$ where the second camera-side contact pin $202a_x$ contacts the second lens-side contact pattern $302a_x$ (hereinafter referred to as a contact range).

Figure 9A:
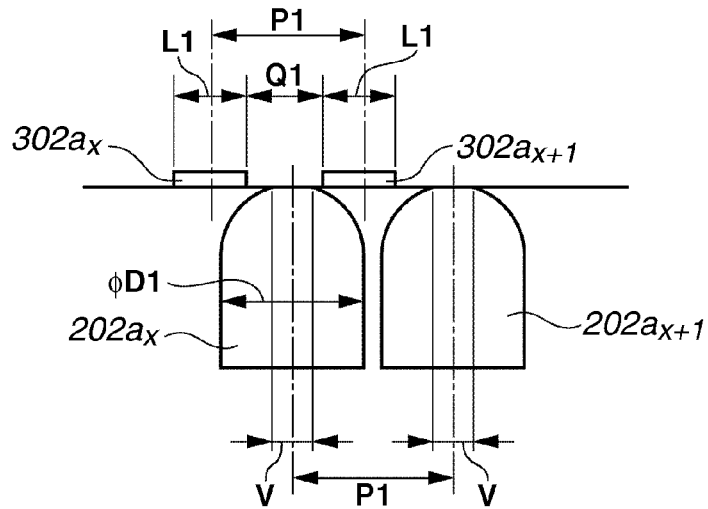
FIG. 9A illustrates the camera-side contact pins when the mounts are in the midst of a rotation according to the first exemplary embodiment.

A first condition is that, as illustrated in FIG. 9A, a single second camera-side contact pin $202a_x$ does not contact two second lens-side contact patterns $302a_x$ and $302a_{x+1}$ adjacent to each other at the same time during a rotation of the interchangeable lens 100 when the interchangeable lens 100 is mounted/dismounted. In other words, the distance Q1 is set to be longer than the width V of the contact range W (Q1>V).

A second condition is that a single second lens-side contact pattern $302a_x$ does not contact two second camera-side contact pins $202a_x$ and $202a_{x+1}$ adjacent to each other at the same time.

Further, a third condition is that the above-described first and second conditions are satisfied even if there is a positional error in the respective second lens-side contact patterns $302a_x$ which reduces the distance therebetween.

Satisfying the first to third conditions can prevent conductions between the second lens-side contact patterns $302a_x$ and $302a_{x+1}$ adjacent to each other, and the second camera-side contact pins $202a_x$ and $202a_{x+1}$ adjacent to each other at the same time which cause a failure such as the short circuit of the power supply.

On the other hand, as illustrated in FIGS. 7B and 8B, the pitch and the distance between the first lens-side contact pattern $302a_y$ ($302a_1$) and the second lens-side contact pattern $302a_{y+1}$ ($302a_2$) are set to a pitch P2 and a distance Q2, which are longer than the pitch P1 and the distance Q1, respectively. The pitch between the first and second camera-side contact pins $202a_y$ and $202a_{y+1}$ (the distance between the pin central axes) is also set to the pitch P2 according to the pitch P2 between the first and second lens-side contact patterns $302a_y$ and $302a_{y+1}$.

First, the range WW, which is wider than the range W, is the range of the first camera-side contact pin $202a_y$ where the first camera-side contact pin $202a_y$ can contact the first lens-side contact pattern $302a_y$ (the estimated contact range), based on which the pitch P2 and the distance Q2 are determined. Further, according thereto, the pitch P2 and the distance Q2 are also determined based on the width of the first lens-side contact pattern $302a_y$, which is set to the width L2 wider than the width L1. Then, the pitch P2 and the distance Q2 are determined to satisfy the following conditions.

Figure 9B:
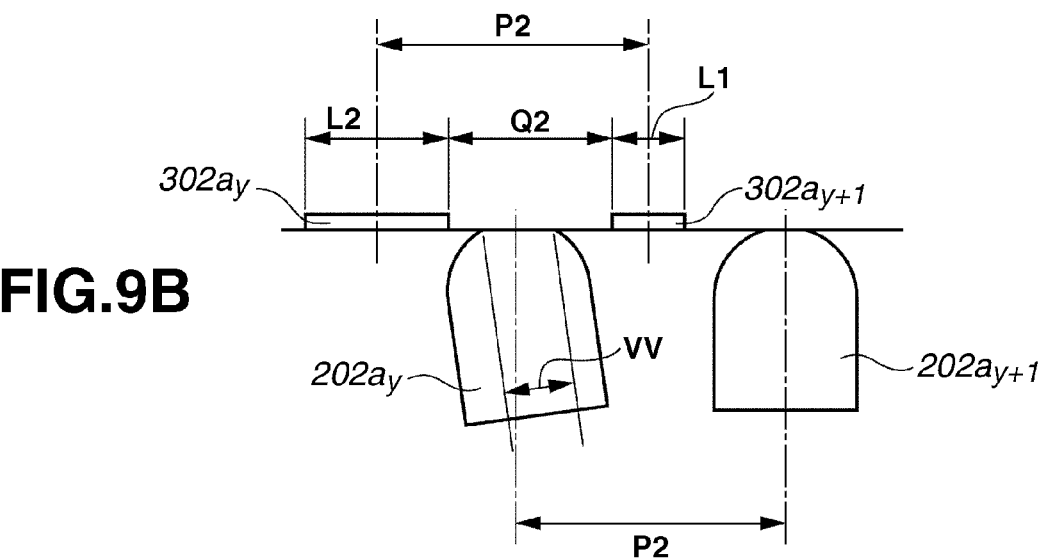
FIG. 9B illustrates the camera-side contact pins when the mounts are in the midst of a rotation according to the first exemplary embodiment.

A first condition is that, as illustrated in FIG. 9B, the first camera-side contact pin $202a_y$ does not contact the first and second lens-side contact patterns $302a_y$ and $302a_{y+1}$ adjacent to each other at the same time during a rotation of the interchangeable lens 100 when the interchangeable lens 100 is mounted/dismounted. In other words, the distance Q2 is set to be longer than the width VV of the estimated contact range WW (Q2>VV). It should be noted that the pitch P2 is longer than the width VV (P2>VV).

Figure 9C:
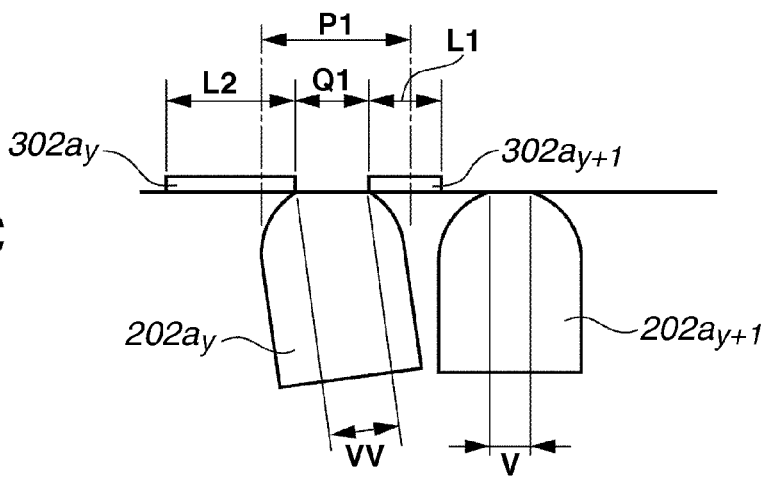
FIG. 9C illustrates the camera-side contact pins when the mounts are in the midst of a rotation according to the first exemplary embodiment.

FIG. 9C illustrates an example in which the pitch P1 and the distance Q1 are set as the pitch and the distance between the first and second lens-side contact patterns $302a_y$ and $302a_{y+1}$ adjacent to each other. In this case, the first camera-side contact pin $202a_y$ contacts the first and second lens-side contact patterns $302a_y$ and $302a_{y+1}$ at the same time.

As described above, the camera-side contact pin $202a_1$ can be inclined or deformed due to abutment (hitting) of the lens-side contact seat 302. If the camera-side contact pin $202a_1$ contacts the pattern for the DTEF terminal, which is the first lens-side contact pattern $302a_1$, and the second lens-side contact pattern $302a_2$ for the DGND terminal adjacent thereto at the same time, the following failure occurs. As described above, the camera microcomputer 20 determines the type of the mounted interchangeable 100 based on the voltage value of the DTEF_IN terminal. If the camera-side contact pin $202a_1$ contacts the pattern for the DTEF terminal and the pattern for the DGND terminal at the same time, conduction is established between the pattern for the DTEF terminal and the pattern for the DGND terminal, so that the camera microcomputer 20 may incorrectly determine the type of the interchangeable lens 100. The camera microcomputer 20 sets the voltage for communication with the interchangeable lens 100 based on this determination result. Therefore, if the camera microcomputer 20 determines a lens of a type different from the actually mounted interchangeable lens, this leads to a failure to set an appropriate communication voltage, resulting in inability of normal communication. Therefore, in the present exemplary embodiment, the distance between the first lens-side contact pattern $302a_1$ and the second lens-side contact pattern $302a_2$ adjacent thereto is increased in consideration of a possible inclination and deformation of the camera-side contact pin $202a_1$.

A second condition is that the single first lens-side contact pattern $302a_y$ does not contact the first and second camera-side contact pins $202a_y$ and $202a_{y+1}$ adjacent to each other at the same time.

Further, a third condition is that the above-described first and second conditions are satisfied even if there is a positional error of the first lens-side contact pattern $302a_y$, which reduces the distance between the first lens-side contact patterns $302a_y$ and the second lens-side contact pattern $302a_{y+1}$.

Satisfying the first to third conditions can prevent conduction between the first and second lens-side contact patterns $302a_y$ and $302a_{y+1}$ adjacent to each other and the first and second camera-side contact pins $202a_y$ and $202a_{y+1}$ adjacent to each other at the same time, which causes a failure such as the short circuit of power supply.

FIGS. 3A and 3B each illustrate the pitches P1 and P2 as angular ranges $\theta_{p1}$ and $\theta_{p2}$ on the camera-side and lens-side contact seats 202 and 302 circularly formed on the camera-side and lens-side mounts 201 and 301. Further, FIG. 3B illustrates the distances Q1 and Q2 as angular ranges $\theta_{Q1}$ and $\theta_{Q2}$ on the lens-side contact seat 302 circularly formed on the lens-side mount 301.

Naturally, in consideration of a rotational amount at the time of coupling between the bayonet teeth, it is effective to reduce the pitch between the camera-side contact pins $202a_n$ as much as possible within the above-described range that does not cause, for example, a short circuit of power to prevent increase of the rotational amount. However, the pitch between the first camera-side contact pin $202a_1$ and the second camera-side contact pin $202a_2$ adjacent thereto should be determined in consideration of an inclination and a deformation at the first camera-side contact pin $202a_1$ due to abutment (hitting) of the lens-side contact seat 302, as described above. Therefore, in the present exemplary embodiment, the pitch between the first camera-side contact pin $202a_1$ and the second camera-side contact pin $202a_2$ adjacent thereto is increased compared to the pitch between the other second camera-side contact pins $202a_x$ and $202a_{xx1}$.

Figure 10:
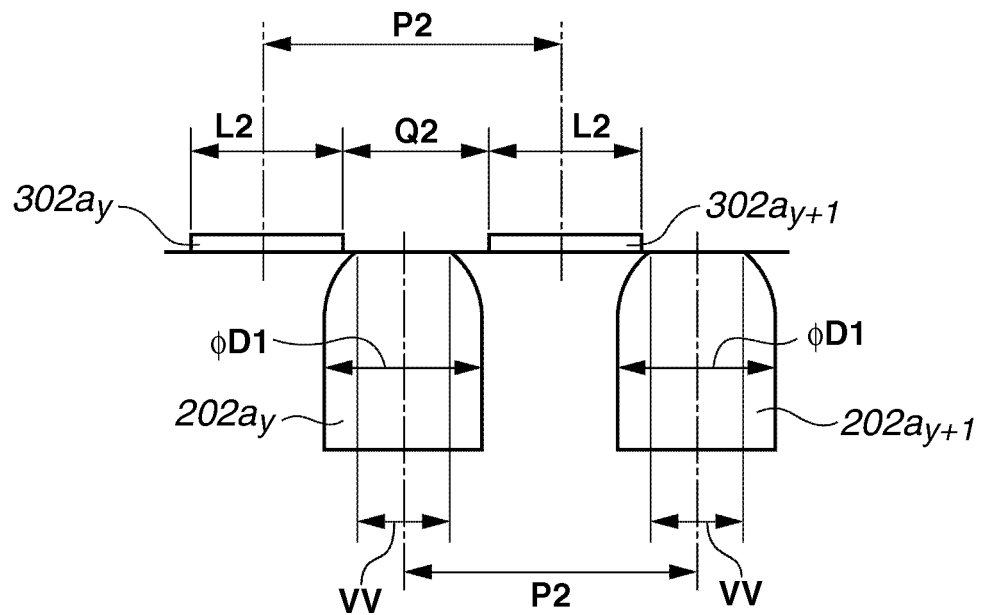
FIG. 10 illustrates camera-side contact pins according to a modification of the first exemplary embodiment.

The present exemplary embodiment is described based on an example that includes one first lens-side contact pattern $302a_y$. However, a plurality of first lens-side contact patterns $302a_y$ may be provided together with a plurality of first camera-side contact pins $202a_y$. In this case, as illustrated in FIG. 10, a similar effect can also be acquired by setting the pitch and the distance between the first lens-side contact pattern $302a_y$ and another first lens-side contact pattern $302a_{yil}$ adjacent thereto to the pitch P2 and the distance Q2, respectively. Further, the pitch between the first and second camera-side contact pins $202a_y$ and $202a_x$, which correspond to the first and second lens-side contact patterns $302a_y$ and $302a_x$ adjacent to each other, is also set to the pitch P2. However, the pitch and distance between the first and second lens-side contact patterns $302a_y$ and $302a_x$ adjacent to each other do not necessarily have to be the same as the pitch and the distance between the two first lens-side contact patterns $302a_y$ and $302a_{y+1}$ adjacent to each other. In other words, assuming that P2a and Q2a are the pitch and the distance between the first and second lens-side contact patterns $302a_y$ and $302a_x$ adjacent to each other, and P2b and Q2b are the pitch and the distance between the two first lens-side contact patterns $302a_y$ and $302a_{y+1}$ adjacent to each other, the pitches and distances may be in the following relationship.

$P2a \neq P2b$ (provided that $P1<P2a$)

$Q2a \neq Q2b$ (provided that $Q1<Q2a$)

In this case, the pitches P2b and P2a are set as the pitch between the first lens-side contact patterns $302a_y$ and $302a_{y+1}$ adjacent to each other, and the pitch between the first and second lens-side contact patterns $302a_y$ and $302a_x$ adjacent to each other, respectively.

In this way, the present exemplary embodiment uses the first and second lens-side contact patterns $302a_y$ and $302a_x$ and the first and second camera-side contact pins $202a_y$ and $202a_x$ that satisfy the following conditions (1) to (3). It should be noted that, as described above, the pitch Q2 and the distance Q2 include the above-described pitches and distances P2a, P2b, Q2a, and Q2b.

$$L1<L2(\theta_{L1}<\theta_{L2}) \qquad (1)$$

$$P1<P2(\theta_{P1}<\theta_{P2}) \qquad (2)$$

$$Q1<Q2(\theta_{Q1}<\theta_{Q2}) \qquad (3)$$

Due to this dimensional arrangement, it is possible to secure a normal contact (electric contact) between the first camera-side contact pin $202a_y$ and the first lens-side contact pattern $302a_y$ that contacts the first camera-side contact pin $202a_y$ even if the first camera-side contact pin $202a_y$ is inclined or deformed due to strong abutment of the lens-side contact seat 302 on the first camera-side contact pin $202a_y$. Therefore, it is possible to prevent occurrence of a communication error, which might otherwise be caused between the camera 10 and the interchangeable lens 100 due to a failure of such a normal contact, and occurrence of a malfunction of the camera 10 and the interchangeable 100, which might otherwise be caused by a short circuit of power.

Further, it is desirable to satisfy a fourth condition, which requires the above-described distance $L_A$ to be shorter than or equal to the distance $L_B$, as a condition for an operation (or for control) when the interchangeable lens 100 is mounted on the camera 10. In other words, it is desirable that at least one of the width L2, the pitch P2, and the distance Q2 is set in such manner that the DTEF terminal is connected before or at the same time as the MIF terminal.

<<Regarding Diameter of Camera-Side Contact Pin>>

Figure 12A:
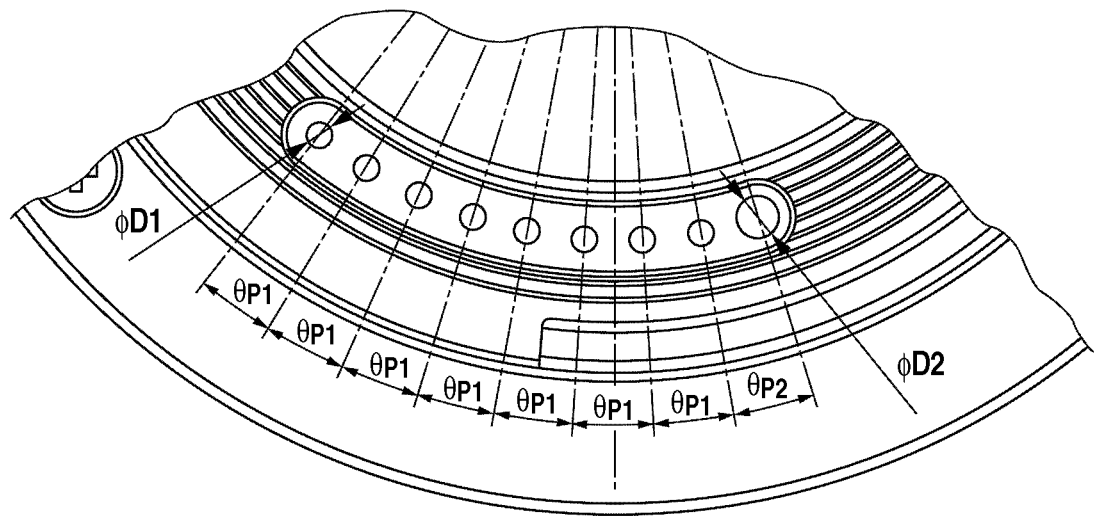
FIG. 12A illustrates camera-side contact pins according to another modification of the first exemplary embodiment.
Figure 12B:
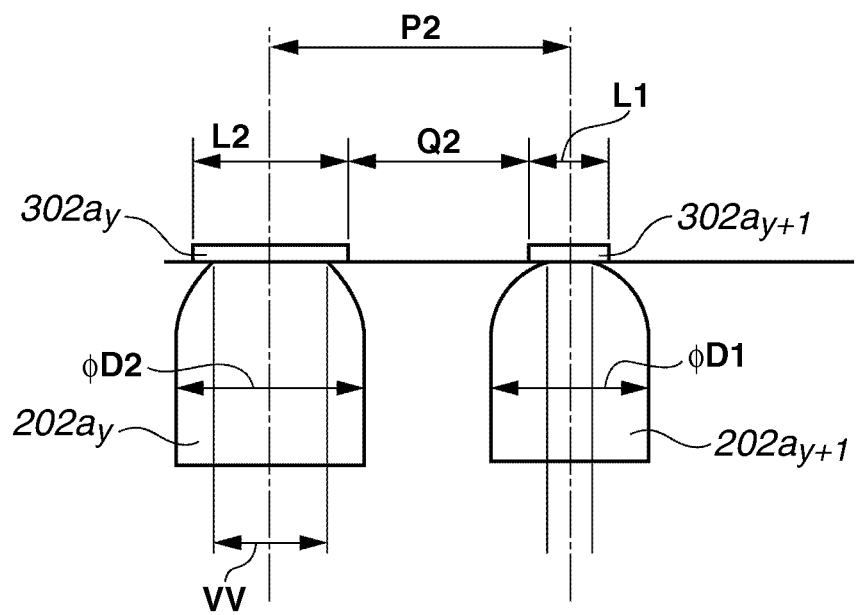
FIG. 12B illustrates camera-side contact pins according to another modification of the first exemplary embodiment.

As described above, the first camera-side contact pin $202a_y$ ($202a_1$) may be deformed by, for example, being bent due to a strong hitting of the first camera-side contact pin $202a_y$ ($202a_1$) against the lens-side contact seat 302 when the mount is in the abutment state. Such a deformation can be prevented by setting a diameter φD2 of the first camera-side contact pin $202a_y$ to be longer than a diameter φD1 of the second camera-side contact pin $202a_x$ ($202a_2$ to $202a_9$) to increase the rigidity of the first camera-side contact pin $202a_1$, as illustrated in FIGS. 12A and 12B.

In other words, the diameter φD2 of the first camera-side contact pin $202a_y$ and the diameter φD1 of the second camera-side contact pin $202a_x$ may be set so as to satisfy the following condition (4).

$$\phi D1 < \phi D2 \quad (4)$$

This dimensional arrangement can reduce the possibility of occurrence of a communication error and a short circuit of power due to a deformation of the first camera-side contact pin $202a_y$.

All of the above-described conditions (1) to (4) do not have to be necessarily satisfied. The effect of the present invention can be realized by satisfaction of at least one of the conditions (1), (2) and (4). Satisfying at least one of the conditions (1), (2) and (4) makes it possible to secure a normal contact between the inclined or deformed first camera-side contact pin $202a_y$ and the first lens-side contact pattern $302a_y$. Then, satisfying the condition (3) can solve the above-described problem of a short circuit of power.

In addition, further satisfying the above-described condition that the distance $L_A$ is shorter than or equal to the distance $L_B$ (the distance $L_B$ is longer than or equal to the distance $L_A$) makes it possible to set a communication voltage appropriate for the type of the interchangeable lens 100 mounted on the camera 10 before a start of communication between the camera 10 and the interchangeable lens 100. Therefore, it is possible to prevent occurrence of a communication error due to setting of an inappropriate communication voltage.

<<Regarding Layout of Pins>>

Figure 16:
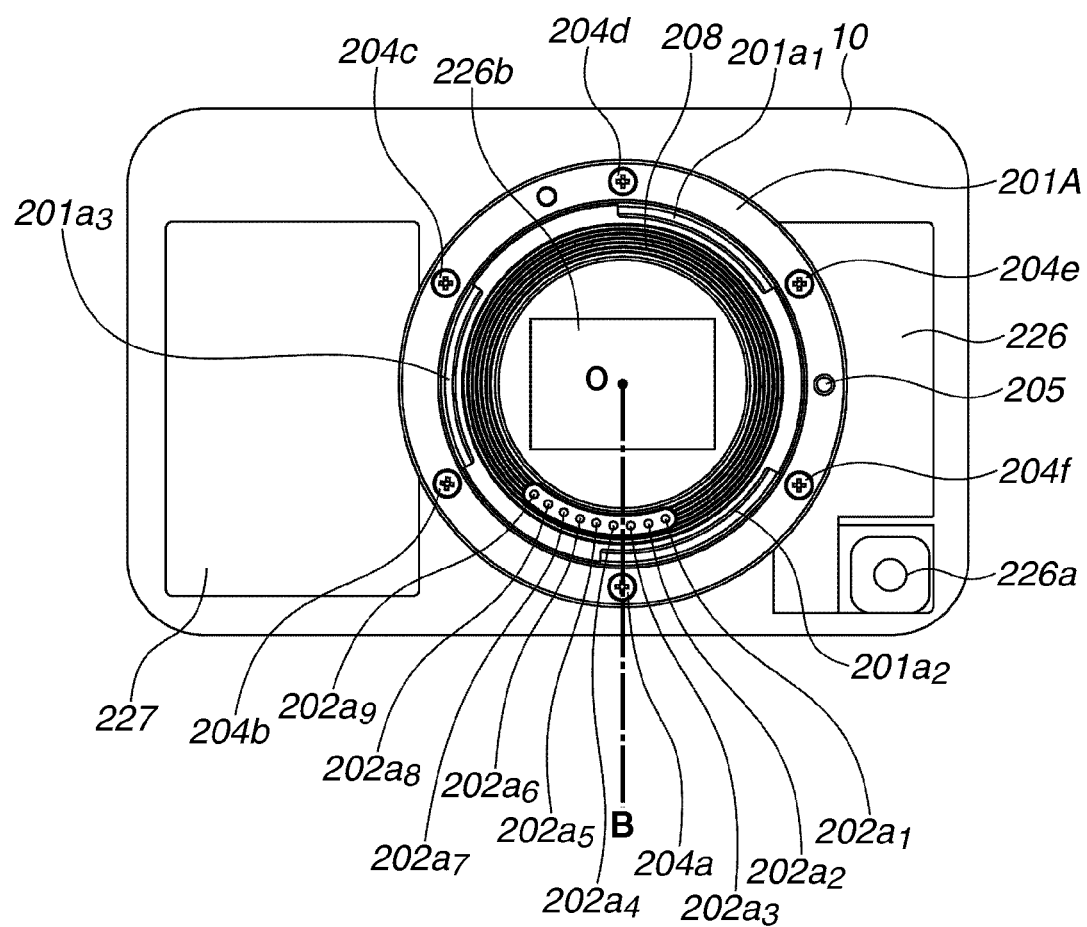
FIG. 16 is a front view illustrating the configuration of the camera that is the first exemplary embodiment and uses a molded mount.
Figure 17:
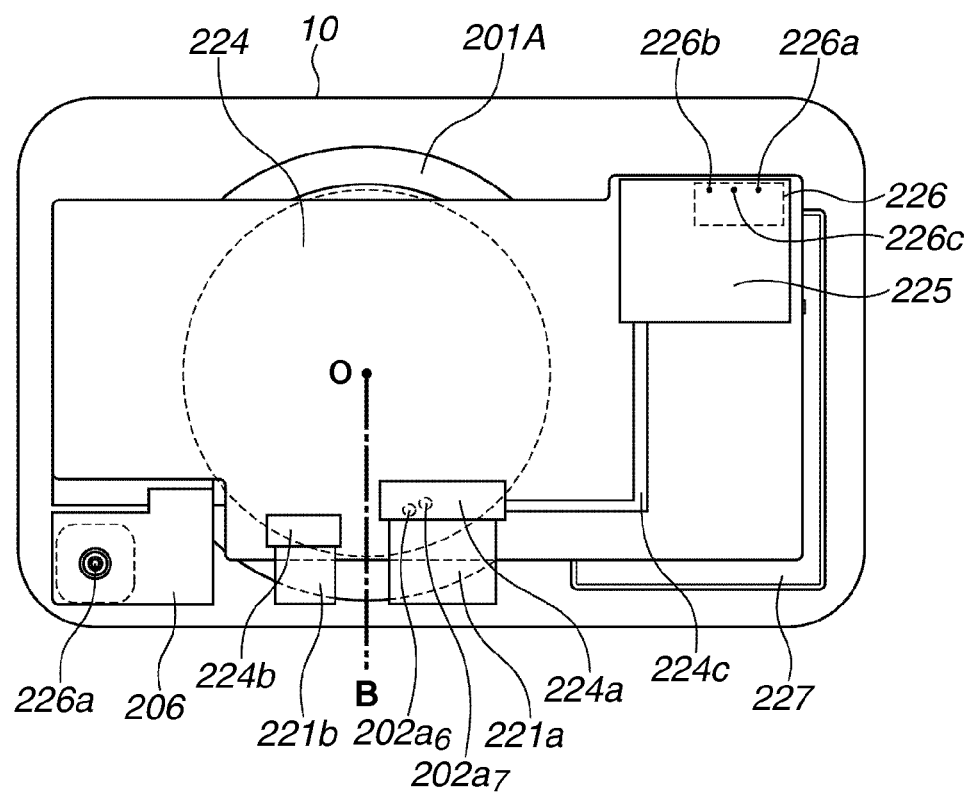
FIG. 17 is a back view illustrating the configuration of the camera illustrated in FIG. 16.
Figure 18:
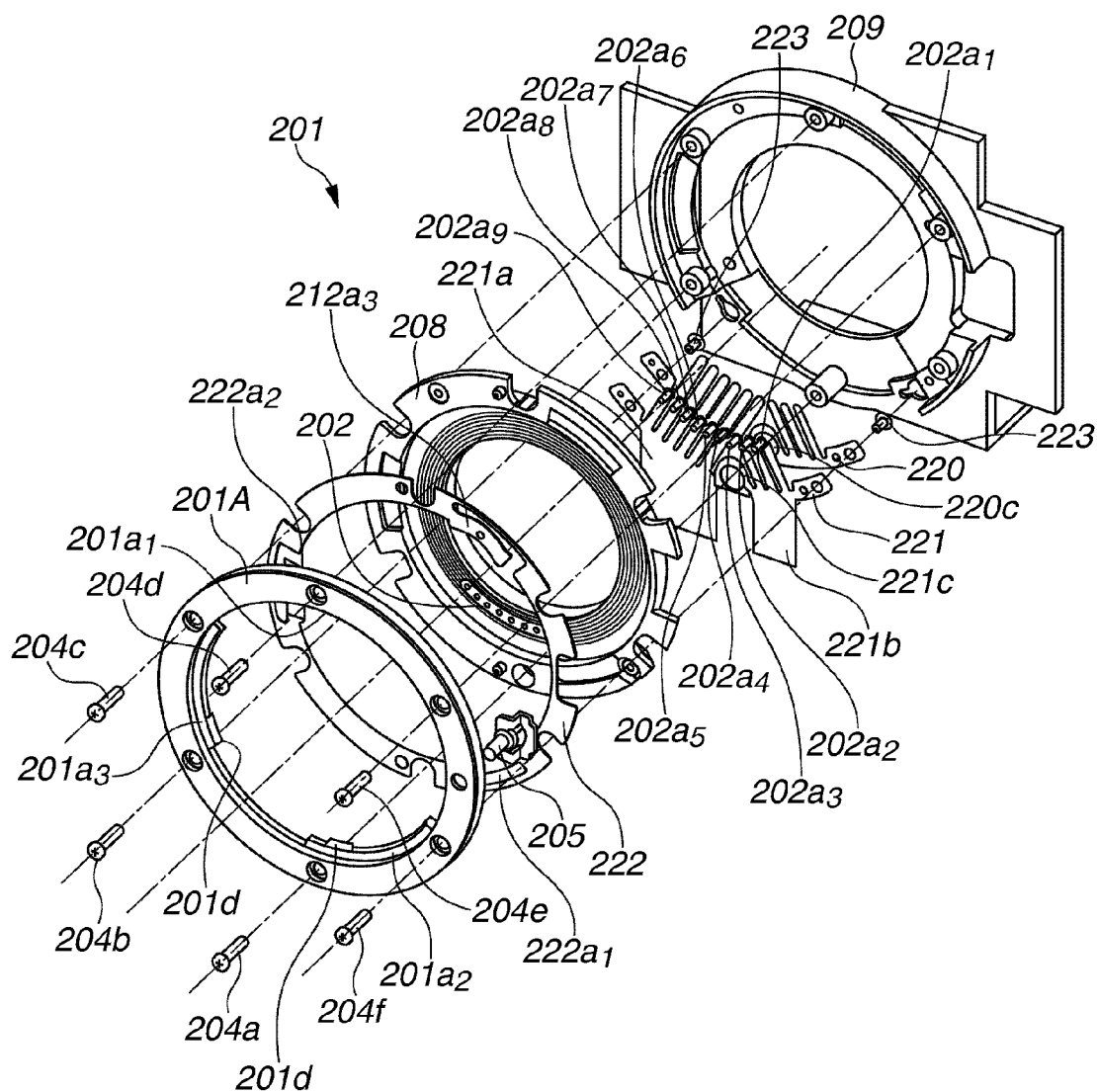
FIG. 18 is an exploded perspective view of the mount of the camera illustrated in FIG. 16.

FIGS. 16, 17, and 18 illustrate a configuration of the camera-side mount 201 using the molded mount. FIG. 16 illustrates an internal configuration of the camera-side mount 201 and the camera 10 as viewed from the front side of the camera 10. FIG. 17 illustrates the internal configuration of the camera 10 as viewed from the back side of the camera 10. Further, FIG. 18 illustrates an exploded view of the camera-side mount 201.

The configuration illustrated in FIGS. 16 to 18 is basically similar to the configuration illustrated in FIGS. 2 to 4, and members in common with FIGS. 2 to 4 are indicated by the same reference numerals as FIGS. 2 to 4, without descriptions of the members. However, in FIGS. 16 to 18, especially, the ring-shaped member having the mount reference surface 201b and the camera-side bayonet teeth $201a_1$ to $201a_3$ (labeled as 201a in FIG. 2A) at the camera-side mount 201 is referred to as a molded mount 201A. The molded mount 201A is formed by mold-forming of a resin such as polycarbonate containing glass fibers.

FIGS. 16 to 18 illustrate an example in which the camera-side mount 201 includes the molded mount 201A, a mount ground plate 208, a mount spring 222, the lock pin 205, and others.

Further, FIG. 18 illustrates a contact spring 220 of a plate spring, which is used instead of the contact springs $202b_1$ to $202b_9$ of the coil springs illustrated in FIG. 4. Further, FIG. 18 illustrates an example in which base ends of the camera-side contact pins $202a_1$ to $202a_9$ are fixed and electrically connected to distal ends of nine wiring portions of a flexible printed wiring board 221 used instead of the flexible printed wiring board 206 illustrated in FIG. 4.

The flexible printed wiring board 221 and the contact spring 220 are fixed to aback surface of the mount ground plate 208 by two screws 223 so as to overlap in this order. The above-described camera-side contact seat 202 is formed at the mount ground plate 208.

A hole 221c is formed at the flexible printed wiring plate 221. A fastening screw 204a at a lowermost position, which will be described below, penetrates through the hole 221c. Then, a first extraction portion 221a and a second extraction portion 221b are formed at the respective sides of the hole 221c in the mount circumferential direction. Six wiring portions for the camera-side contact pins $202a_4$ to $202a_9$ are formed at the first extraction portion 221a. Further, three wiring portions for the camera-side contact pins $202a_1$ to $202a_3$ are formed at the second extraction portion 221b.

The contact spring 220 is disposed between the camera-side mount 201 (the mount ground plate 208) and the camera main body 209, and biases the camera-side contact pins $202a_1$ to $202a_9$ in a direction causing them to protrude from the camera-side contact seat 202 by the respective nine spring arms. The hole 220c, which the lowermost fastening screw 204a penetrates through, is also formed at this contact spring 220. Then, six spring arms for the camera-side contact pins $202a_4$ to $202a_9$, and three spring arms for the camera-side contact pins $202a_1$ to $202a_3$ are formed at the respective sides of the hole 220c in the mount circumferential direction.

Figure 19:
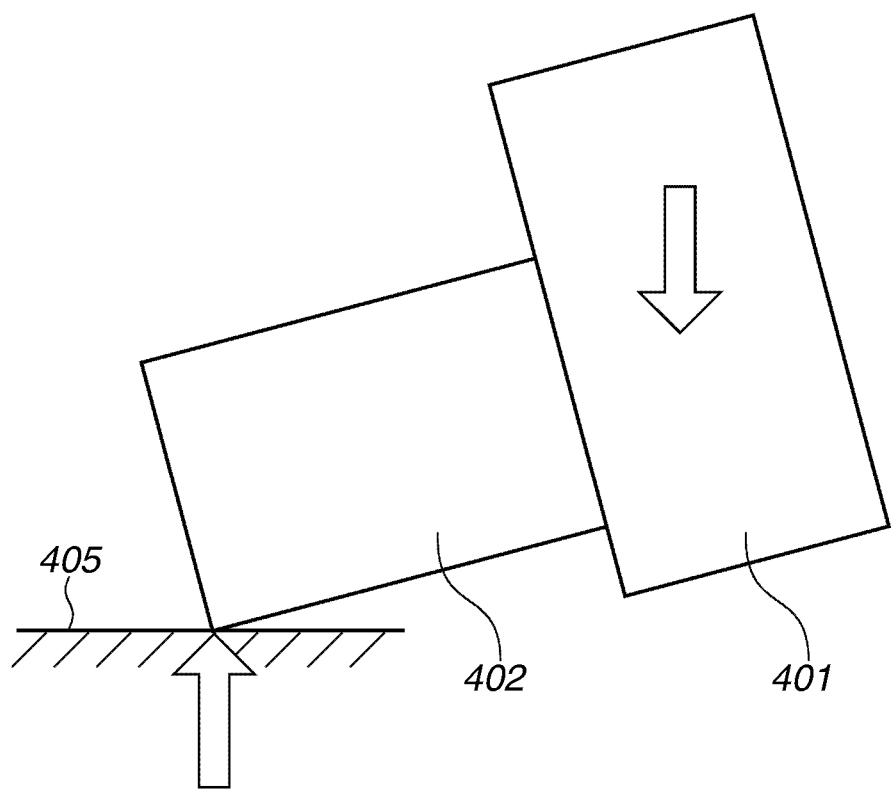
FIG. 19 illustrates how an external force is applied when the camera is dropped.

As described above, the molded mount 201A is made by mold-forming of a resin, and use of this molded mount 201A for the camera-side mount 201 may lead to a shortage of a strength compared to a camera-side mount using a metallic mount. When the camera 10 is dropped as described with reference to FIG. 19, a maximum external force is applied to the camera-side bayonet tooth $201a_2$ formed at an angular range including the lowermost position of the molded mount 201A, among the three camera-side bayonet teeth $201a_1$ to $202a_3$ formed at the molded mount 201A.

A horizontally extending orientation of the camera 10 illustrated in FIG. 16 is referred to as a normal orientation (or a horizontal orientation). The lowermost position of the molded mount 201A (i.e., the camera-side mount 201) is a position which a chain line B extending vertically downwardly from a center O of the camera-side mount 201 passes through when the camera 10 is in the normal orientation, among the positions of the molded mount 201A in the mount circumferential direction. In other words, the lowermost position of the molded mount 201A is a position located undermost when the camera 10 is in the normal orientation, among the positions of the molded mount 201A in the mount circumferential direction. Further, similarly, the lowermost position of the camera-side contact seat 202 is a position located lowermost when the camera 10 is in the normal orientation, among the positions of the camera-side contact seat 202 in the mount circumferential direction.

As apparent from FIG. 16, when the camera 10 is in the normal orientation, a shutter opening 226$b$ has a rectangular shape while the hole 220$c$ is formed into a circular shape. Therefore, it is desirable to prevent unnecessary light that passes through the shutter opening 226$b$ (for example, reflective light inside the lens apparatus, and a protrusion formed by the provision of the camera-side contact seat 202) from passing through the shutter opening 226$b$. In this regard, the camera-side contact seat 202 is located away from the shutter opening 226$b$ as far as possible to prevent or reduce transmission of this unnecessary light through the shutter opening 226$b$.

The fastening screws 204$a$ to 204$f$ are used to fix the molded mount 201A to the camera main body 209 illustrated in FIG. 18, and are disposed at even intervals at six positions of the molded mount 201A in the circumferential direction. The fastening screw 204$a$ among these six fastening screws 204$a$ to 204$f$ is disposed in such a manner that a center of the fastening screw 204$a$ is located at the lowermost position of the molded mount 201A. Thus, the camera-side bayonet tooth 201$a_2$ and the fastening screw 204$a$ are disposed at the lowermost position, on which a maximum external force is applied when the camera 10 with the interchangeable lens 100 mounted thereon is dropped, whereby it is possible to secure a sufficient strength against an impact at the time of the drop.

A hole, which the above-described lock pin 205 can penetrate through, is formed at the molded mount 201A. The lock pin 205 projects or retracts from or into the molded mount 201A through this hole.

Further, a shutter unit 226 is disposed inside the camera 10. The shutter unit 226 includes a shutter curtain (not illustrated) which is charged to enter into a closed state by a rotational operation of a shutter charging motor 226$a$, which is a camera-side actuator. The shutter curtain moves in an opening direction relative to the shutter opening 226$b$ due to a release of charging, and after that, moves again in a closing direction while being charged, thereby controlling an exposure amount of the image sensor 11 illustrated in FIG. 1. The shutter charging motor 226$a$ generates noises when rotating to charge the shutter curtain. The shutter charging motor 226$a$ is disposed in the right side (one side) relative to the center O of the molded mount 201A (the camera-side mount 201) as viewed in FIG. 16.

Further, a battery 227 is disposed in the left side (the other side) relative to the center O of the molded mount 201A (the camera-side mount 201). In the front view of FIG. 16, the left portion of the molded mount 201A overlaps with the battery 227. However, the two fastening screws 204$b$ and 204$c$ disposed at the left portion of the molded mount 201A are located at positions capable of avoiding interference with the battery 227. Therefore, the battery 227 can be located closer to the center O of the molded mount 201A (the camera-side mount 201), thereby reducing the size of the camera 10.

As illustrated in FIGS. 2A and 3A, the camera-side contact pins 202$a_1$ to 202$a_9$ are disposed at the camera-side contact seat 202 in the mount circumferential direction.

Referring to FIG. 18, the mount spring 222 includes spring pieces 222$a_1$, 222$a_2$, and 222$a_3$ formed at three positions of the mount spring 222 in a circumferential direction thereof. The spring pieces 222$a_1$ to 222$a_3$ draw in the lens-side bayonet teeth 301$a$ (refer to FIG. 2B) engaged with the camera-side bayonet teeth 201$a_1$ to 201$a_3$ toward the camera main body 209, respectively.

A static pressure receiver 201$d$ is disposed in the back side of each of the camera-side bayonet teeth 201$a_1$ to 201$a_3$. The static pressure receiver 201$d$ has a function of holding the interchangeable lens 100 without intermediation of the mount spring 22 by abutting against the lens-side bayonet tooth 301$a$ when a load of a predetermined value or larger is applied to the mount spring 222 (the spring pieces 222$a_1$ to 222$a_3$) toward an opposite side from the camera body 209. The static pressure receiver 201$d$ is formed at the lowermost position at the camera-side bayonet tooth 201$a_2$ formed within the angular range of the molded mount 201A that includes the lowermost position.

At the thus-configured camera-side mount 201, the fastening screw 204$a$ is disposed at the lowermost position of the molded mount 201A as described above, so that the contact spring 220 is disposed to avoid this fastening screw 204$s$. More specifically, the nine spring arms of the contact spring 220 are disposed to extend toward the camera-side contact pins 202$a_1$ to 202$a_9$ from the respective sides of the fastening screw 204$a$ in the mount circumferential direction between the camera-side mount 201 (the mount ground plate 208) and the camera main body 209.

In this case, it is effective to arrange the nine spring arms of the contact spring 220 to exert uniform biasing forces sufficient for maintaining the camera-side contact pins 202$a_1$ to 202$a_9$ in contact with the lens-side contact patterns 302$a_1$ to 302$a_9$. In addition, it is necessary to configure the contact unit including the camera-side contact pins 202$a_1$ to 202$a_9$ (the flexible printed wiring board 221) and the contact spring 220 as small as possible. For these reasons, it is necessary to uniform the widths, lengths, and deformation amounts of the respective nine spring arms of the contact spring 220.

Assuming that the camera-side contact pin is disposed at the lowermost position of the camera-side contact seat 202, which is right above the fastening screw 204$a$, and the nine screw arms of the contact spring 220 have same widths and lengths, it becomes necessary to increase the inclination of the spring arm that extends from beside the fastening screw 204 to this camera-side contact pin. As a result, it becomes necessary to increase the pitches of the nine spring arms of the contact spring 220 and the pitches of the camera-side contact pins 202$a_1$ to 202$a_9$ beyond the above-described conditions required for the pitches. This leads to an increase in an angular range occupied by the camera-side contact pin 202$a_1$ to 202$a_9$ in the mount circumferential direction (an occupied angular range).

Further, even if the lowermost position of the camera-side mount 201, which receives a maximum load when the camera 10 is dropped, is securely fixed by the fastening screw 204$a$, a maximum impact is applied to the camera-side contact pin disposed at the lowermost position of the camera-side contact seat 202. It is better not to dispose the camera-side contact pin at the lowermost position of the camera-side contact seat 202 to prevent the camera-side contact pin from being damaged such as being bent or broken by such an impact.

Accordingly, in the present exemplary embodiment, the camera-side contact pins 202$a_1$ to 202$a_9$ are disposed at positions other than the lowermost position when the camera 10 is in the normal orientation, among positions of the camera-side contact seat 202 in the mount circumferential direction. This positional arrangement can reduce the occupied angular range of the camera-side contact pins 202$a_1$ to 202$a_9$ while allowing the camera-side contact pins 202$a_1$ to 202$a_9$ to be biased sufficiently and evenly in the projecting direction, and further, can enhance impact resistance when the camera 10 is dropped.

Further, FIG. 17 illustrates a circuit board 224 and a power source circuit block 225 disposed on the circuit board 224. Further, a connector 226 connected to a terminal of the battery 227 is indicated by a broken line in FIG. 17. The connector 226 is connected to the battery 227 via a positive pole 226a, a negative pole 226b, and an information terminal 226c, and supplies power to the power source circuit block 225.

A first connector 224a is disposed on the circuit board 224. The first connector 224a is connected to the first extraction portion 221a of the flexible printed wiring board 221. Further, a second connector 224b is disposed on the circuit board 224. The second connector 224b is connected to the second extraction portion 221b of the flexible printed wiring board 221.

Among the camera-side contact pins $202a_1$ to $202a_9$, the camera-side contact pin $202a_7$ for the VBAT terminal, which is the contact pin for power supply, is disposed in a side where the power source circuit block 225 is located (hereinafter referred to as a power source circuit side) relative to the center O of the camera-side mount 201, together with the camera-side contact pin $202a_6$ for the PGND terminal. In other words, the camera-side contact pin $202a_7$ for the VBAT terminal, which a large current flows through, is located closer to the power source circuit block 225, compared to disposing the camera-side contact pin $202a_7$ at a side where the shutter charging motor 226a is located (a camera actuator side: hereinafter referred to as a motor side), relative to the center O of the camera-side mount 201. As a result, it is possible to reduce a loss due to a wiring resistance of the circuit board 224 and the flexible printed wiring board 221 when a current for power supply flows from the power source circuit block 225 to the camera-side contact pin $202a_7$ for the VBAT terminal.

Further, the first extraction portion 221a of the flexible printed wiring board 221, which is connected to the six camera-side contact pins $202a_4$ to $202a_9$, is disposed closer to the power source circuit side relative to the center O of the camera-side mount 201. On the other hand, the second extraction portion 221b of the flexible printed wiring board 221, which is connected to the three camera-side contact pins $202a_1$ to $202a_3$, is disposed closer to the motor side relative to the center O. In other words, the number of the camera-side contact pins $202a_4$ to $202a_9$ disposed closer to the power source circuit side relative to the center O is larger than the number of the camera-side contact pins $202a_1$ to $202a_3$ disposed closer to the motor side relative to the center O. Due to this positional arrangement, it is possible to realize such a configuration that, for example, exchanges of signals between the camera 10 and the interchangeable lens 100 are less affected by noises from the shutter charging motor 226a.

FIGS. 16 to 18 illustrate the configuration of the camera 10, but do not especially illustrate the configuration of the interchangeable lens 100. However, the layout of the lens-side contact patterns $302a_1$ to $302a_3$ at the interchangeable lens 100 completely coupled to the camera 10 in the normal orientation is similar to the layout of the camera-side contact pins $202a_1$ to $202a_3$ when the camera 10 is in the normal orientation, which has been described with reference to FIGS. 16 to 18.

In other words, the lens-side contact patterns $302a_1$ to $302a_9$ are disposed at positions other than the lowermost position, which is the lowest position in the coupling completion state when the camera 10 is in the normal orientation, among positions of the lens-side contact seat 302 in the mount circumferential direction.

Further, in the coupling completion state, among the lens-side contact patterns $302a_1$ to $302a_9$, the lens-side contact pattern $302a_7$ for the VBAT terminal, which is the contact surface for power supply, is disposed in the power source circuit side of the camera 10 relative to the center of the lens-side mount 301, together with the lens-side contact pattern $302a_6$ for the PGND terminal. Further, the number of the lens-side contact pins $302a_4$ to $302a_9$ disposed in the power source circuit side relative to the center of the lens-side mount 301 is larger than the number of the lens-side contact pins $302a_1$ to $302a_3$ disposed in the motor side relative to this center.

In this way, in the present exemplary embodiment, the camera-side contact pins $202a_1$ to $202a_9$ and the lens-side contact patterns $302a_1$ to $302a_9$ are disposed at positions of the contact seats 202 and 302 other than the lowermost positions when the camera 10 is in the normal orientation (and the camera 10 and the interchangeable lens 100 are in a completely coupled state). Therefore, it is possible to reduce the occupied angular ranges of the contact pins/contact patterns at the respective mounts 201 and 301. Accordingly, it is possible to reduce the sizes of the camera 10 and the interchangeable lens 100. Further, in the present exemplary embodiment, the camera-side contact pin $202a_7$ and the lens-side contact pattern $302a_7$ for power supply at the camera side and the lens side are disposed in the power source circuit side of the camera 10. Further, the number of contacts disposed in the power source circuit side relative to the centers O of the mounts 201 and 301 is larger than the number of contacts disposed in the motor side. As a result, it is possible to realize a configuration capable of reducing a loss due to a wiring resistance, and further, impervious to noises.

Figure 11A:
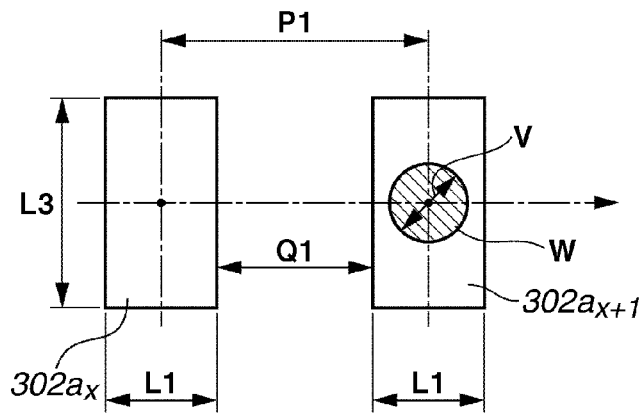
FIG. 11A illustrates lens-side contact patterns and camera-side contact pins according to a second exemplary embodiment of the present invention.
Figure 11B:
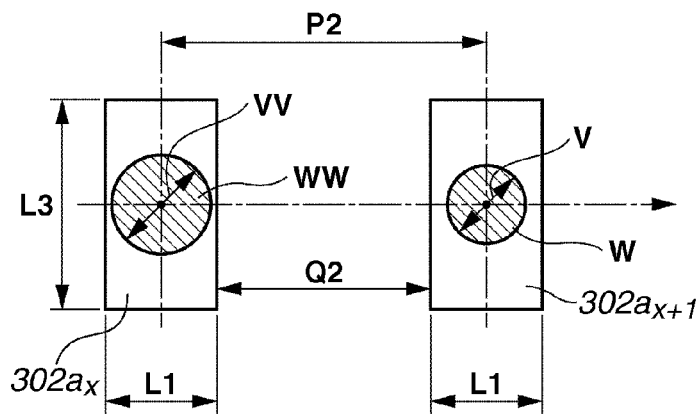
FIG. 11B illustrates lens-side contact patterns and camera-side contact pins according to a second exemplary embodiment of the present invention.
Figure 11C:
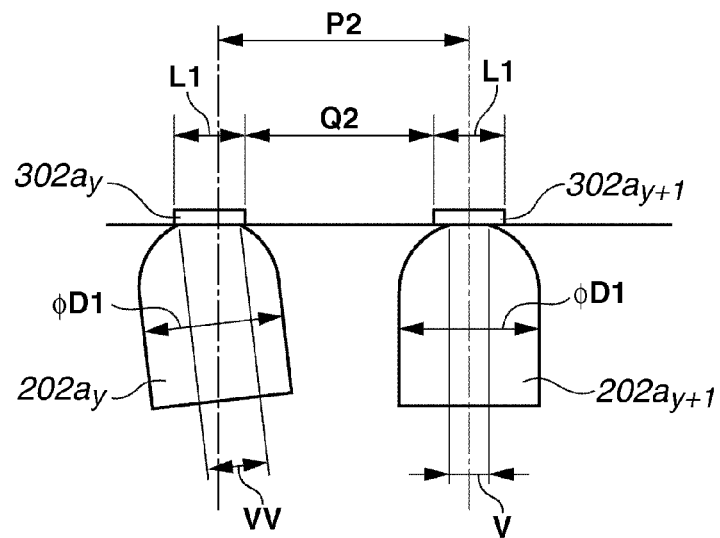
FIG. 11C illustrates lens-side contact patterns and camera-side contact pins according to a second exemplary embodiment of the present invention.

FIGS. 11A to 11C illustrate an example that satisfies the above-described conditions (2) and (3) but does not satisfy the conditions (1) and (4), as a second exemplary embodiment of the present invention. In the present exemplary embodiment, the pitch P2 and the distance Q2 between the first and second lens-side contact patterns $302a_y$ and $302a_{y+1}$ adjacent to each other are longer than the pitch P1 and the distance Q1 between the second lens-side contact patterns $302a_x$ and $302a_{x+1}$ adjacent to each other. Further, the pitch P2 between the first and second camera-side contact pins $202a_y$ and $202a_{y+1}$ adjacent to each other is also longer than the pitch P1 between the second camera-side contact pins $202a_x$ and $202a_{x+1}$ adjacent to each other.

However, the width of the first lens-side contact pattern $302a_y$ is the width L1, which is the same as the width of the second lens-side contact pattern $302a_x$ ($302a_{y+1}$). However, the width L1 in this case is set so as to be wider than the width L1 described in the description of the first exemplary embodiment, and slightly wider than the range WW where the first camera-side contact pin $202a_y$ can contact the first lens-side contact pattern $302a_y$ (the estimated contact range).

Further, all of the diameters of the first and second camera-side contact pins $202a_y$ and $202a_{y+1}$ ($202a_x$ and $202a_{x+1}$) are the same diameter φD1.

Even in this case, it is possible to secure a normal contact between the inclined or deformed first camera-side contact pin $202a_y$ and the first lens-side contact pattern $302a_y$ to prevent occurrence of a communication error between the camera 10 and the interchangeable lens 100 and a short circuit of power.

Further, even in another exemplary embodiment than the second exemplary embodiment, which satisfies the condition (2) but does not satisfy the conditions (1), (3), and (4), it is possible to secure a normal contact between the inclined or deformed first camera-side contact pin $202a_y$ and the first lens-side contact pattern $302a_y$. As a result, it is possible to prevent occurrence of a communication error between the camera 10 and the interchangeable lens 100.

According to the above-described exemplary embodiments, both the heights of the first and second lens-side contact patterns $302a_y$ and $302a_x$ are set to the height L3. However, they may be set differently.

The respective exemplary embodiments described above are merely representative examples, and various modifications and changes can be made to the respective exemplary embodiments when actually carrying out the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2012-085190 filed Apr. 4, 2012, No. 2012-085223 filed Apr. 4, 2012, No. 2012-085426 filed Apr. 4, 2012, No. 2012-150961 filed Jul. 5, 2012, and No. 2012-161644 filed Jul. 20, 2012, which are hereby incorporated by reference herein in their entirety.

The invention claimed is:

1. A camera comprising:
a first mount to which a second mount disposed in a camera accessory including an actuator is detachably coupled,
wherein the camera is communicable with the coupled camera accessory,
wherein the first mount is configured to shift from a first state to a second state, the first state being such a state that a second bayonet tooth disposed in the second mount is inserted between a plurality of first bayonet teeth disposed in the first mount, the second state being such a state that a relative rotation between the first mount and the second mount causes the first bayonet teeth and the second bayonet tooth to be engaged with each other to complete coupling between the first mount and the second mount, wherein a first contact holding portion disposed in the first mount holds first, second, third and fourth contact pins disposed along a rotational direction of the second mount and the first mount, and the first, second, third and fourth contact pins are disposed adjacent to each other and are disposed in the order of the first, second, third and fourth contact pins,
wherein, in the second state, the first, second, and third contact pins are in contact with first, second, and third electrical contact surfaces held by a second contact holding portion disposed in the second mount, respectively, whereby an electric connection is established between the camera and the camera accessory,
wherein the first, second, and third contact pins are disposed in such a manner that, when the mount shifts from the first state to the second state, the third contact pin contacts the first and second electrical contact surfaces, the second contact pin contacts the first electrical contact surface, and the first pin does not contact the second and third electrical contact surfaces, and
a sixth contact pin,
wherein the first contact pin is a pin for detecting that the camera accessory is coupled to the camera, the second contact pin is a pin for supplying electrical power for communication to the coupled camera accessory, and the third contact pin is a pin for supplying electrical power for driving the actuator of the camera accessory, wherein the fourth contact pin is used for indicating a reference potential corresponding to the electrical power supplied from the third contact pin, and the sixth contact pin is used for indicating a reference potential corresponding to the electric power from the second contact pin.

2. The camera according to claim 1, wherein the fourth contact pin is grounded with respect to the third contact pin.

3. The camera according to claim 1, wherein a fifth contact pin is disposed adjacent to the fourth contact pin, and the sixth contact pin is disposed adjacent to the fifth contact pin, and
wherein the fifth contact pin is a pin for communication with the coupled camera accessory, and the sixth contact pin is grounded with respect to the second contact pin.

4. The camera according to claim 3, wherein a seventh contact pin is disposed adjacent to the sixth contact pin, and the seventh contact pin is a pin for detecting a type of the coupled camera accessory.

5. A camera accessory comprising:
a second mount configured to be detachably coupled to a first mount disposed in a camera; and
an actuator configured to be driven to move an optical member, wherein the second mount can shift from a first state to a second state, the first state being such a state that a second bayonet tooth disposed in the second mount is inserted between a plurality of first bayonet teeth disposed in the first mount, the second state being such a state that a relative rotation between the first mount and the second mount causes the second bayonet tooth and the first bayonet teeth to be engaged with each other to complete coupling between the first mount and the second mount,
wherein a contact holding portion disposed in the second mount holds first, second, and third electrical contact surfaces disposed along a rotational direction of the second mount and the first mount, and the first, second, third and fourth electrical contact surfaces are disposed adjacent to each other and are disposed in the order of the first, second, third and fourth electrical contact surfaces,
wherein, in the second state, the first, second, and third electrical contact surfaces are in contact with first, second, and third contact pins disposed in the first mount of the camera, respectively, whereby an electric connection is established between the camera accessory and the camera,
wherein the first, second, and third electrical contact surfaces are disposed in such a manner that, when the mount shifts from the first state to the second state, the first electrical contact surface contacts the third pin first and then the second contact pin, and the second electrical contact surface contacts the third contact pin, and
wherein the first electrical contact surface is an electrical contact surface for the camera to detect that the camera accessory is coupled to the camera, the second electrical contact surface is an electrical contact surface for receiving electrical power for communication from the coupled camera, and the third electrical contact surface is an electrical contact surface for receiving electrical power for driving the actuator from the coupled camera,
wherein the fourth electric contact surface is used for indicating a reference potential corresponding to the electric power to the third electric surface, and a sixth electric contact surface is used for indicating a reference potential corresponding to the electric power to the second electric contact surface.

6. The camera accessory according to claim 5, wherein the fourth electrical contact surface is disposed adjacent to the third electrical contact surface, and the fourth electrical contact surface is a grounded electrical contact surface with respect to the third electrical contact surface.

7. The camera accessory according to claim 6, wherein a fifth electrical contact surface is disposed adjacent to the fourth electrical contact surface, and the sixth electrical contact surface is disposed adjacent to the fifth electrical contact surface, and
wherein the fifth electrical contact surface is an electrical contact surface for communication with the coupled camera, and the sixth electrical contact surface is a grounded contact surface with respect to the second electrical contact surface.

8. The camera accessory according to claim 7, wherein a seventh electrical contact surface is disposed adjacent to the sixth electrical contact surface, and the seventh electrical contact surface is an electrical contact surface for indicating a type of the camera accessory.

9. A camera accessory comprising: a mount; and
an actuator configured to be driven to move an optical member, wherein first, second, third and fourth electrical contact surfaces are disposed in the order of the first, second, and third electrical contact surfaces, and the first, second, third and fourth electrical contact surfaces are disposed adjacent to each other, and
wherein the first electrical contact surface is an electrical contact surface connected to the ground (GND) level, the second electrical contact surface is a an electrical contact surface configured to receive supply of electrical power for communication from the coupled camera, and the third electrical contact surface is an electrical contact surface configured to receive electrical power for driving the actuator from the coupled camera,
wherein the fourth electric contact surface is used for indicating a reference potential corresponding to the electric power to the third electric surface, and a sixth electric contact surface is used for indicating a reference potential corresponding to the electric Dower to the second electric contact surface.

10. The camera accessory according to claim 9, wherein a fourth electrical contact surface is disposed adjacent to the third electrical contact surface, and the fourth electrical contact surface is a grounded electrical contact surface with respect to the third electrical contact surface.

11. The camera accessory according to claim 9, further comprising fifth electrical contact surfaces disposed adjacent to the fourth electrical contact surface, and a sixth electrical contact surface is disposed adjacent to the electrical fifth contact surfaces,
wherein each of the fifth electrical contact surfaces is an electrical contact surface for communication with the coupled camera.

12. The camera accessory according to claim 11, wherein a seventh electrical contact surface is disposed adjacent to the sixth electrical contact surface, and the seventh electrical contact surface is an electrical contact surface for the camera to detect a type of the camera accessory.

* * * * *